United States Patent [19]
Tripp

[11] 3,725,654
[45] Apr. 3, 1973

[54] MACHINE TOOL CONTOUR CONTROL SYSTEM

[75] Inventor: Robert W. Tripp, Tuckahoe, N.Y.

[73] Assignee: Inductosyn Corporation, Valhalla, N.Y.

[22] Filed: Feb. 22, 1971

[21] Appl. No.: 117,582

[52] U.S. Cl. ............235/151.11, 235/154, 318/571, 318/632
[51] Int. Cl. ............................................G06f 15/46
[58] Field of Search..............235/150.3, 151.11, 154; 318/569–571, 594, 632; 340/346, 351

[56] References Cited

UNITED STATES PATENTS

| | | | |
|---|---|---|---|
| 3,428,876 | 2/1969 | Kelling | 318/571 |
| 3,286,085 | 11/1966 | Rado | 235/151.11 |
| 3,411,094 | 11/1968 | Martiner | 235/151.11 X |
| 3,617,718 | 11/1971 | Dummermuth | 318/571 X |
| 3,633,013 | 1/1972 | Dummermuth | 318/571 X |

*Primary Examiner*—Malcolm A. Morrison
*Assistant Examiner*—Jerry Smith
*Attorney*—William E. Beatty

[57] ABSTRACT

A machine tool contour control system for directing a tool at a preselected substantially constant speed along a straight line path defined by distance components parallel to orthogonal axes. For each axis, a drive means toward the tool through a unit of distance in response to a command pulse for that axis. A generator simultaneously provides to each separate drive means a train of command pulses equal in number to the distance to be moved along the corresponding axis, the distance components being specified by binary inputs. The command pulse rates, and hence the tool speed, depend on the rate at which clock pulses are supplied to the generator.

A path length compensator controls the clock pulse rate as a function of a correction factor related to the length of the straight line path. This compensator comprises appropriate decode logic, responsive to the command pulses, for setting a decrementing counter to a value related to the correction factor. A comparator and a binary counter, driven at a programmed rate directly related to the preselected speed, cooperate with the decrementing counter to provide clock pulses at a rate equal to the programmed rate times the correction factor. Another compensator further modifies the clock pulse rate depending on the position of the most significant one bit in the largest of the binary inputs bypassing the inactive bits of greater significance.

20 Claims, 15 Drawing Figures

MACHINE TOOL CONTOUR CONTROL SYSTEM

BACKGROUND OF THE INVENTION

1. Field of the Invention

The present invention relates to a machine tool contour control system, and more particularly to a system for directing the motion of a machine tool at a preselected, substantially constant speed along a straight line path defined by distance components parallel to a plurality of non-coincident axes.

2. Description of the Prior Art

Prior art machine tool controls for machine tool movements at constant speed typically employ apparatus for generating command pulses for each of two orthogonal axes. Those orthogonal axes are typically designated X and Y axes. For movement only along one axis, for example the X axis, no pulses are generated along the Y-axis while one pulse per unit of distance to be moved is generated for the X axis.

Similarly, for movement only along the Y axis, no X axis command pulses are generated while the desired number of Y axis pulses are generated. For movements other than along the X or along the Y axis, command pulses are generated both along the X and Y axes in proportion to the components of movement that each of the X and Y axes contribute to the resultant movement. For example, movement along an axis 45° between the X and Y axes is achieved by an equal number of X and Y axes pulses. For movement along an axis having an angle closer to the X axis than the Y axis, the number of X axis command pulses generated is greater than the number of Y axis command pulses. Similarly, for movement along an axis closer to the Y axis, the number of Y axis command pulses generated is greatest.

In the prior art, the components of movement along the X axis and along the Y axis are designated by digital numbers. The magnitude of the resultant distance traveled is equal to the square-root of the sum of the squares of the X and Y components. The angle of movement is, of course, defined by the ratio of the X and Y components.

In addition to the digital numbers for the X and Y components, a digital number representing the rate of travel along the resultant path is typically employed. In order for the machine tool to travel at a programmed constant speed along the resultant path, independent of the direction and distance of travel, the rate of the command pulses generated for the X and Y axes must be varied as a function of the direction of travel.

Prior art systems have generally employed a source of clock pulses at a pre-programmed frequency for generating both the x axis and the Y axis command pulses. In order that the resultant speed of travel be constant regardless of the direction of travel (that is independent of the ratio of the X and Y commanded movement) the clock frequency is modified by a correction factor proportional to the square-root of the sum of the squares of the X and Y components.

Various prior art techniques are available for performing this modification of the clock frequency. In one technique, analog representations of the X and Y components are summed, squared and square-rooted to form a control signal for varying the frequency of a variable frequency oscillator.

Other prior art approaches employ digital techniques for summing, squaring and square-rooting the X and Y components in order to derive a correction factor. Still further, other prior art systems have employed various calculations which generate a correction factor closely approximating the square-root of the sum of the squares correction factor. For example, one approximation derives a correction factor proportional to the difference between the sum of the squares of the X and Y components with the square of the programmed rate. Other similar techniques for generating an approximate correction factor are known. While these techniques have been somewhat satisfactory, they have been slow in operation, incompatible with fully digital circuits, or expensive to implement.

In addition to the compensation factor employed for obtaining a constant resultant path rate of travel, prior art systems have employed interpolators for forming an approximately uniform distribution of the command pulses over the period during which the command motion is to be carried out. One such prior art interpolator comprises a chain of bistable elements driven by pulses of a fixed frequency. The stages of the bistable elements are inter-connected, in a manner conventional to digital counters, such that carry and non-carry pulses are generated from each stage where the carry pulses from each stage serve as the input to the next stage. By the selection of non-carry outputs from selected stages of the frequency divider, command pulses are gated onto a common line. The number of those command pulses is equal to the distance to be traveled along the respective axis and, further, they are approximately uniformly spaced over the time period of the command.

The fixed frequency supplied as an input to the interpolators of the previous paragraph are typically corrected by the length correction factor. The combination of the path length correction factor with the interpolator yields output pulses along the X and Y axes which are both evenly distributed over the command period and which result in constant machine tool motion. While combinations of path length compensators and interpolators are known, there is a need for improved devices having higher speeds, greater reliability and lower cost.

SUMMARY OF THE INVENTION

In accordance with the present invention there is provided a machine tool contour control system for directing a machine tool at a preselected substantially constant speed along a contoured path approximated by a plurality of straight line segments. Each straight line segment is defined by distance components parallel to a plurality of non-coincident, herein orthogonal, axes. The system comprises separate drive means for each axis, each drive means being operative to move the tool through a unit of distance along the corresponding axis in response to a command pulse for that axis.

A command pulse generator accepts binary signals representing the distance components for each axis. In an exemplary two axis embodiment, binary signals designated ΔX and ΔY and representing distance components along respective orthogonal X- and Y- axes, are stored in respective ΔX and ΔY storage units incorporated in the command pulse generator. The command pulse generator also includes a binary counter which counts in response to computed feed rate clock pulses supplied thereto.

Appropriate comparator logic is provided in the command pulse generator which cooperates with the binary counter and with the ΔX storage unit to produce a train of FRx command pulses equal in number to the value of ΔX, and approximately uniformly spaced over the time period taken to count through M active counter stages. The comparator also cooperates with the ΔY storage unit and with the binary counter to produce a train of FRy command pulses equal in number to the value of ΔY, and approximately uniformly spaced over the same time period as the FRx command pulses. In particular, the comparator produces an FRx or FRy command pulse each time the $i^{th}$ stage of the binary counter is false, the $i^{th}$ stage being a stage which is false when all preceding counter stages of the lesser significance are true, simultaneously with a bit of ΔX and ΔY corresponding to the $i^{th}$ stage being true.

The command pulse generator is divided into modules each having four binary counter stages, four bits of ΔX and ΔY storage, and a corresponding four bit comparator. Appropriate circuitry determines which of the modules contains the "first 1", that is, the binary one in either ΔX or ΔY having the greatest significance. This module associated with four bit portions of ΔX and ΔY of significance greater than that of the "first 1" are designated inactive. The computed feed rate clock pulses automatically by-pass the inactive modules and are fed directly to the first active module. This minimizes the time taken to perform a cut of particular length.

To insure that the command pulses are generated at rates appropriate to cause machine tool motion at the preselected substantially constant speed $V_t$, a correction factor is derived which is related to the length of the straight line path to be followed by the tool. This correction factor then is used in a path length compensator to modify the rate at which computed feed rate clock pulses are provided to the command pulse generator.

The correction factor utilized by the path length compensator has the value $2^m/\Delta T$, where M represents the number of counter stages in the active modules of the command pulse generator, and ΔT represents the length of the straight line path traversed by the machine tool. The correction factor is obtained by assuming $M=4$, and by evaluating ΔT using the weighted values of three digit data groups including the "first 1" and the two bits of next lesser significance in the largest of ΔX and ΔY, and the three bits of corresponding significance in the other of ΔX and ΔY. The correction factor so obtained then is approximated by a fraction $k/8$, where $k$ is an integer less than 16.

The path length compensator includes a counter which is advanced in unison with that counter stage in the command pulse generator which enables production of the command pulses associated with the "first 1." Appropriate decoding logic, responsive to the contents of this path length compensator counter and to occurrence of an FRx or FRy command pulse, provides signals to control a decrementing counter. Specifically, the decoding logic sets the contents of the decrementing counter equal to $k$, and causes the decrementing counter to lock up and remain set at this value.

The path length compensator receives clock pulses at a rate directly proportional to the preselected constant speed $V_t$. Actual rate multiplication is accomplished by using the received clock pulses to drive a binary counter, the contents of which is compared with the contents of the decrementing counter. The comparator unit provides as an output $k$ feed rate clock pulses for each 16 pulses provided from the clock source.

The normalized correction factor used by the path length compensator results in production of feed rate clock pulses at the rate appropriate for stepping the first command pulse enabling counter stage in the command pulse generator. A position of "first 1" compensator further modifies the rate at which feed rate clock pulses are supplied to the first active module, to insure that the first command pulse enabling stage then is advanced at just the rate required to achieve machine tool motion at the preselected speed $V_t$.

Clock pulses initially are supplied by a feed rate clock, typically a voltage controlled oscillator, operating at a frequency related to the maximum permissible speed for the particular system. A feed rate corrector then divides this clock rate by an appropriate factor related to the programmed speed $V_t$, and supplied clock pulses to the path length compensator at the resultant rate. The feed rate corrector itself may accept programmed feed rate data in the "magic 3" or similar format, as specified by the Electronic Industries Association Specification RS–274–A.

The command pulse generator of the present invention is a digital interpolator which converts digital values, e.g. ΔX and ΔY, into pulse trains. The number of pulses in each cycle for the pulse trains equals the digital values. Further, those pulses are substantially evenly distributed over each cycle.

The digital interpolator includes a first counter constituted by a plurality of counting stages. The count in that first counter is stepped cyclically through a count range by clock pulses. The digital inputs received from a store or other source are compared with the count in the first counter. The comparator is constituted by a string of gates interconnected in a counting order. For example, a binary counting order is constituted by a string of gates serially connected, input to output, high order to low order, with at least one gate per stage of the first counter. The string of gates detects the "all 1" condition of the higher order stages of the first counter. Those high order stages are compared, by a group of gates, with the digital value such as ΔX. The output from that group of gates is effective to gate selected ones of the clock pulses thereby forming the desired pulse train.

BRIEF DESCRIPTION OF THE DRAWINGS

Still other objects, features and attendant advantages of the present invention will become apparent to those skilled in the art from a reading of the following detailed description of the preferred embodiments constructed in accordance therewith, taken in conjunction with the accompanying drawings wherein like numerals designate like parts in the several figures and wherein.

DESCRIPTION OF THE PREFERRED EMBODIMENTS

Figure 1A:
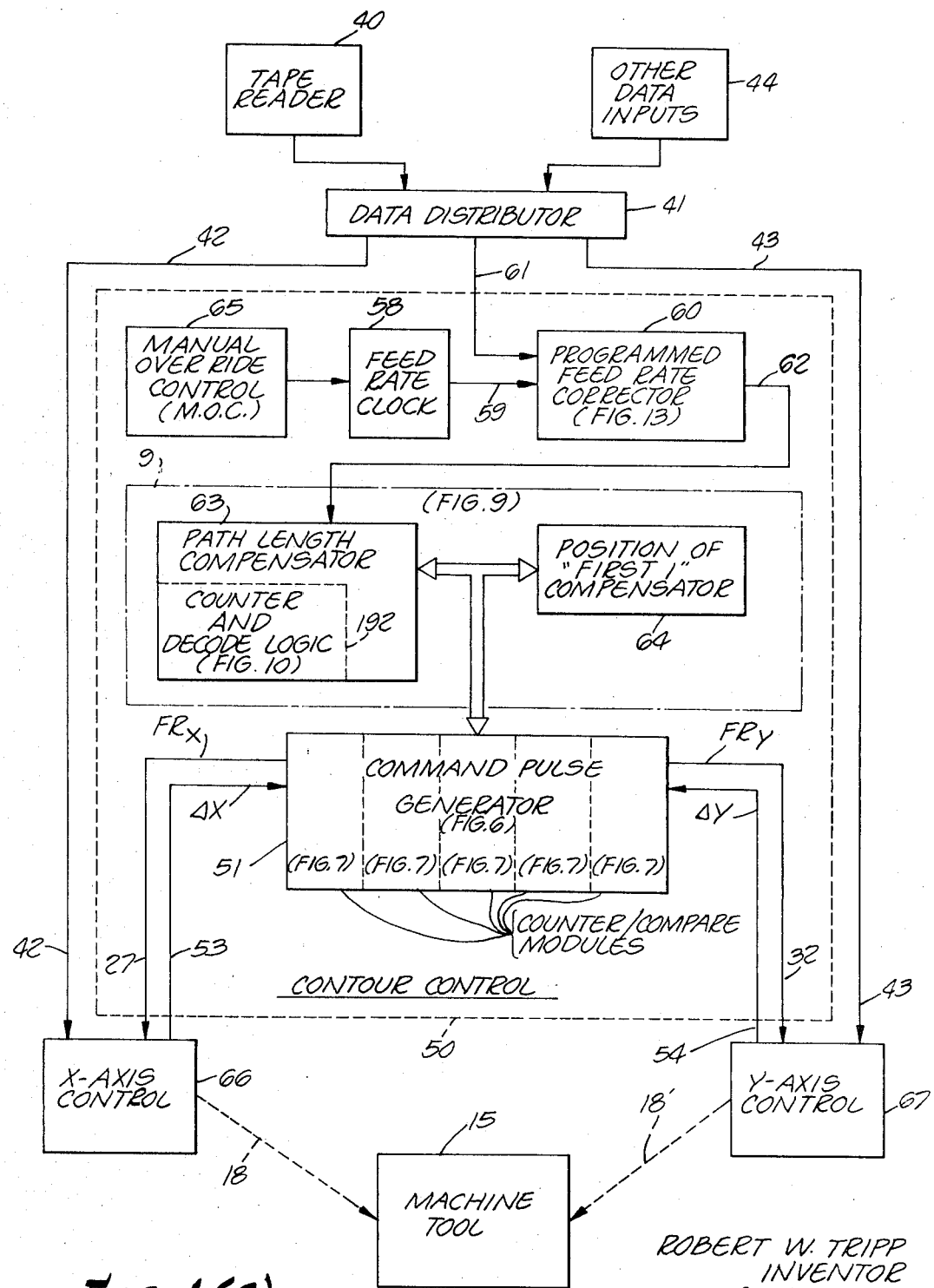
FIG. 1(a) is an electrical block diagram of a machine tool contour control system in accordance with the present invention.
Figure 1B:
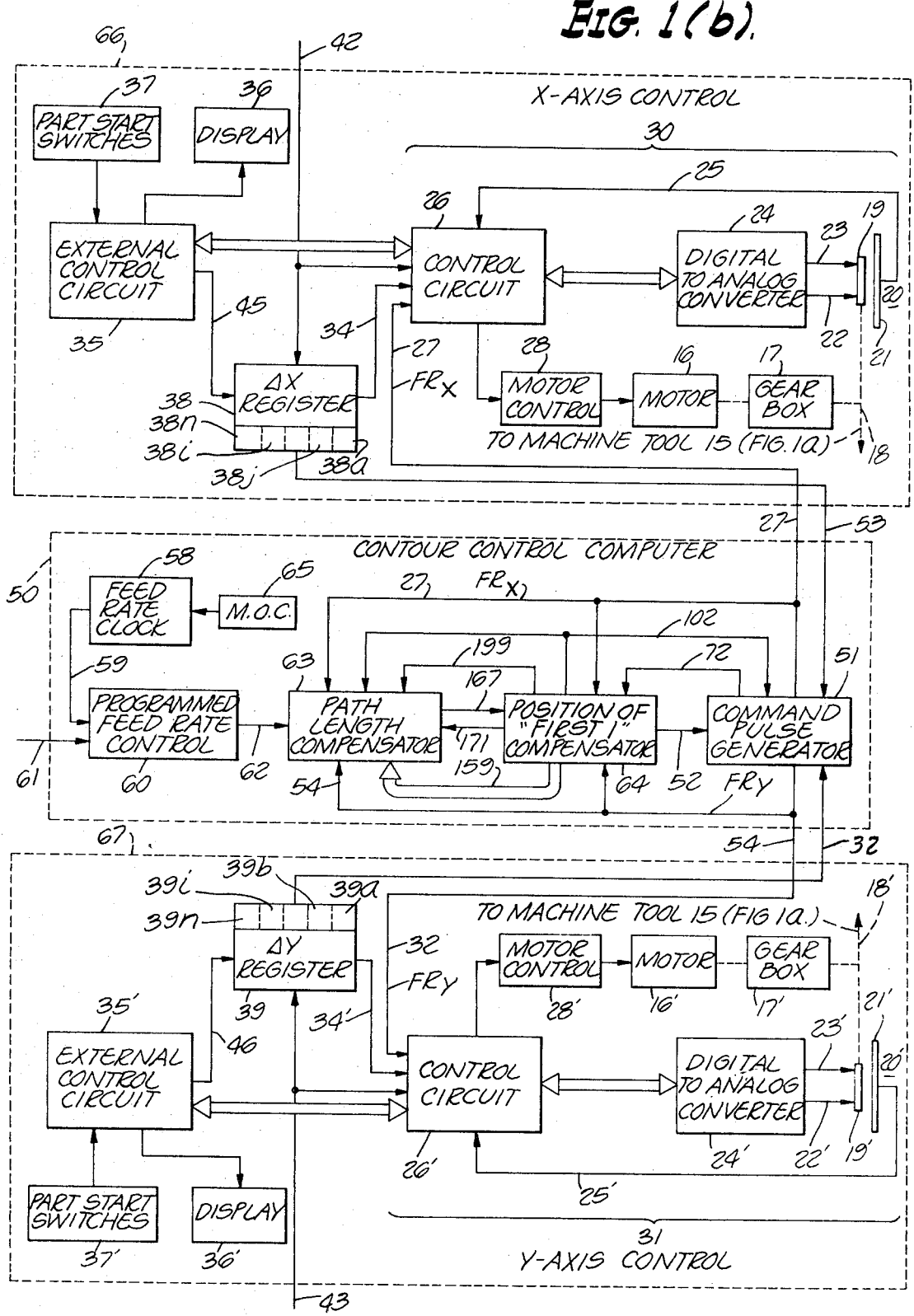
FIG. 1(b) depicts further details of the X-axis control, Y-axis control and contour control of FIG. 1(a).

Referring now to the drawings, and particularly to FIGS. 1a and 1b thereof, there is shown a block diagram of a machine tool contour control system in accordance with the present invention. The system is operative to move a machine tool along a straight line path at a preselected substantially constant tool speed regardless of the resultant path length. Although an embodiment is illustrated wherein the machine tool is moved along a path specified by distance components parallel to a pair of non-coincident axes, the invention is equally applicable to systems of more than two axes.

X-Axis and Y-Axis Controls

The system of FIG. 1(a) and FIG. 1(b) is used to control the motion of a machine tool 15, e.g., the cutting tool of a mill, which tool may be positioned independently and simultaneously along orthogonal X- and Y-axes. As shown in FIG. 1(b), machine tool 15 is driven parallel to the X-axis by a motor 16 cooperating with a gear box 17 and a drive shaft 18. Mechanically coupled to X-axis drive shaft 18 is a movable member 19 of a position measuring device 20. Position measuring device 20 also includes a stationary member 21 which may be fixedly mounted to the machine tool bed (not shown).

Still referring to FIG. 1(b), position measuring device 20 may be a multi-pole position measuring transformer of the type marketed under the registered trademark "Inductosyn" and described, for example, in U. S. Pat. No. 2,799,835. Such a position measuring transformer includes on one element, advantageously movable member 19, two windings in space quadrature of the pole cycle of the device; these windings are energized with trigonometrically related signals supplied via a pair of lines 22 and 23 from a digital to analog converter 24. The other element of position measuring device 20, advantageously stationary member 21, may include a continuous conductor forming a multi-polar secondary winding for the device.

Position measuring device 20 provides an error signal on a line 25 depending on a comparison of the relative displacement of the inductively related elements 19 and 21 with the input of trigonometrically related signals from digital to analog converter 24. Thus, the error signal on line 25 is indicative of the position of machine tool 15 along the X-axis, as compared with a position represented by the trigonometrically related signals on lines 22 and 23.

Digital to analog converter 24 may be one of the types described in applicant's copending applications entitled DIGITAL-TO-ANALOG CONVERTER, Ser. No. 645,161, filed June 12, 1967; DIGITAL AND ANALOG CONVERTER, Ser. No. 854,816, filed Sept. 3, 1969; or TRIGONOMETRIC SIGNAL GENERATOR AND MACHINE CONTROL, Ser. No. 864,079, filed Oct. 6, 1969. Each of these digital-to-analog converters produces a pair of trigonometrically related analog signals of fixed relative phase and having amplitude components proportional respectively to the sine and cosine of an angle $\theta = 2\pi n/N$, where N is a constant, and n is an integer between 1 and N.

Thus, in a typical embodiment of digital to analog converter 24 wherein N=2000, a change of 1 in the value of n would correspond to a change of 0.18° in the value of θ. This would cause the amplitudes of the trigonometrically related signals on lines 22 and 23 respectively to change by amounts proportional to the sine and cosine of 0.18°. In an exemplary embodiment of position measuring device 20, one pole cycle (360 electrical degrees) corresponds to a linear distance of 0.2 inches. For such embodiment, an amplitude change proportional to sin 0.18° and cos 0.18° of the signals on lines 22 and 23 would require linear motion of member 19 through 0.0001 inch to null the resultant error signal.

The error signal from position measuring device 20 may be directed via control circuitry 26 to an appropriate motor control 28. When so directed, the presence of an error signal on line 25 causes motor control 28 to operate motor 16, thereby to move machine tool 15 a sufficient distance, and in an appropriate direction parallel to the X-axis, so as to reduce the error signal on line 25 to a small value. When the error signal is at a minimum, measuring device members 19 and 21 will be positioned in accordance with the value of $\theta$ represented by the trigonometrically related signals on lines 22 and 23.

Thus, for each FRx command pulse received along line 27, the amplitudes of the signals on lines 22 and 23 respectively will change by incremental amounts proportional to sin $2\pi(1/N)$ and cos $2\pi(1/N)$. The resulting error current on line 25 will cause motor 16 to drive machine tool 15 through a corresponding incremental unit of distance along the X-axis. In the example wherein $\theta=2\pi(1/N)=0.18°$, corresponding to linear motion of position measuring device member 19 through a distance of 0.0001 inch, each FRx command pulse will cause machine tool 15 to be moved 0.0001 parallel to the X-axis.

In summary, the above described components 16 through 28 comprise a drive means 30 which is operative to move machine tool 15 through a unit of distance parallel to the X-axis in response to an FRx command pulse for that axis. Similarly, for the Y-axis, a separate drive means 31 comprises components 16' through 26' which are identical in function and operation to the unprimed, like-numbered components in X-axis drive means 30. Thus, Y-axis drive means 31 is operative to move machine tool 15 through a unit of distance parallel to the Y-axis in response to an FRy command pulse for that axis supplied along a line 32.

Still referring to FIG. 1(b), in a mode of operation described in detail in applicant's copending application entitled POSITION MEASURING SYSTEM, Ser. No. 809,533, filed Mar. 24, 1969, the error signal from position measuring device 20 may be used in cooperation with digital-to-analog converter 24 to change the production of the trigonometrically related signals supplied to measuring device number 19. In such a mode of operation, a digital signal is developed in digital-to-analog converter 24 which is representative of the position of machine tool 15 along the X-axis, within one cycle of position measuring device 20.

By use of appropriate external control circuitry 35 cooperating with circuitry 26 and converter 24, the X-axis position of machine tool 15, as measured with respect to a reference part-start position, may be determined and visually indicated on a display 36. A set of manually operated switches 37 is provided for input of the reference part-start position. For the Y-axis, external control circuitry 35', display 36' and part-start position switches 37' are identical in function to the corresponding X-axis components 35, 36, and 37.

The X-axis control 66 of FIG. 1(b) also includes a $\Delta$ register 38 adapted to store a digital signal, herein designated $\Delta X$, representing the distance machine tool 15 is to be moved parallel to the X-axis. Similarly, there is provided another $\Delta$ register 39 in Y-axis control 67 adapted to store a digital representation, herein designated $\Delta Y$, of the distance machine tool 15 is to be moved parallel to the Y-axis. Preferably, $\Delta X$ and $\Delta Y$ are represented in binary form.

The $\Delta$ register 38 also may store a sign bit indicating the desired direction of motion of machine tool 15 parallel to the X-axis. This sign bit is supplied via a line 34 to circuitry 26 and used thereby to control whether digital to analog converter 24 is incremented or decremented by FRx command pulses supplied on line 27. Similarly, $\Delta$ register 39 may store a sign bit, supplied to circuitry 26' via a line 34', which controls the direction of machine tool motion parallel to the Y-axis resultant upon occurrence of an FRy command pulse on line 32.

Data Inputs

Referring to FIG. 1(a), the values $\Delta X$ and $\Delta Y$ for each cut cycle or segment of machine tool motion may be pre-recorded on a punched or magnetic tape (not shown) which is read by a tape reader 40. This $\Delta X$ and $\Delta Y$ information then may be directed to $\Delta$ registers 38 and 39, via a data distributor 41, over a pair of lines 42 and 43. Alternatively, $\Delta X$ and $\Delta Y$ information may be provided via other data inputs 44, for example, from a digital computer (not shown).

In an alternative embodiment, the input data from tape reader 40 or other data inputs 44 may specify the initial and end positions of each cut segment. In this instance, external control circuitry 35 and 35' in FIG. 1(b) may determine the values of $\Delta X$ and $\Delta Y$ and provide appropriate signals along lines 45 and 46 to load $\Delta$ registers 38 and 39 accordingly. In such embodiment, each of $\Delta$ registers 38 and 39 may comprise a binary counter or a binary shift register. Typical apparatus for determining the values of $\Delta X$ and $\Delta Y$ from initial and end position data is set forth in applicant's copending U. S. application entitled POSITION CONTROL SYSTEM, Ser. No. 814,670, filed Apr. 9, 1969.

Contour Control Computer

Referring to FIG. 1(a), the machine tool control system also includes, as part of a contour control computer 50, a command pulse generator (interpolator) 51 which receives computed feed rate clock pulses on a line 52 see FIG. 1(b). In general, command pulse generator 51 accepts $\Delta X$ information from $\Delta$ register 38 (FIG. 1(b)) in X-axis control 66 along a line 53 and provides on line 27 a train of FRx command pulses, the number of FRx pulses being equal to the number of incremental distance units which machine tool 15 is to be moved parallel to the X-axis. The FRx pulses are approximately uniformly spaced over a time period $t$. Similarly, command pulse generator 51 accepts $\Delta Y$ information from $\Delta$ register 39 in Y-axis control 67 along a line 54 and provides on line 32 a train of FRy command pulses, the number of FRy pulses being equal to the number of incremental distance units which machine tool 15 is to be moved parallel to the Y-axis. The FRy pulses are approximately uniformly spaced over the same time period $t$.

Figure 2:
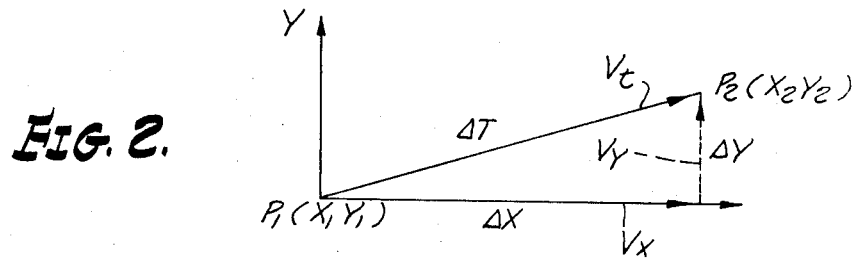
FIG. 2 illustrates the straight line path traversed by a machine tool controlled by the system of FIG. 1, the path being defined by distance components ΔX and ΔY parallel respectively to orthogonal X- and Y-axes.

By spacing the FRx and FRy command pulses over the same time period $t$, straight line motion of machine tool 15 is achieved. That this is so may be understood in conjunction with FIGS. 2 and 3. Referring first to FIG. 2, there is shown a simplified diagram illustrating a desired cut made between two points P1 and P2, in a plane defined by X- and Y-axes. If the initial point P1 is situated at location (X1, Y1), and the end point P2 at position (X2, Y2), then to insure that machine tool 15 cuts along a straight line path from P1 to P2, tool 15 must be moved simultaneously through a distance $\Delta X=(X2-X1)$ parallel to the X axis, and through a distance $\Delta Y=(Y2-Y1)$ parallel to the Y axis. That is, motion parallel to the X- and Y-axes must be coordinated so that the distance $\Delta X$ along the X-axis is traversed in the same time $t$ taken to traverse the distance $\Delta Y$ along the Y-axis. Note that in general, to achieve straight line motion from P1 to P2, the velocity $Vx=\Delta X/t$ will be different from the velocity $Vy=\Delta Y/t$.

Drive means 30 and 31 (FIG. 1(b)) are operative to move machine tool 15 through a unit of distance parallel to the X- and Y-axes, respectively, in response to a command pulse for that axis. Thus, if the command pulse trains FRx and FRy are approximately uniformly spaced over the same period of time $t$, then machine tool 15 will be moved through $\Delta X$ and through $\Delta Y$ in approximately the same period of time, thereby accomplishing the desired straight line motion between points P1 and P2 (FIG. 2).

Figure 3:
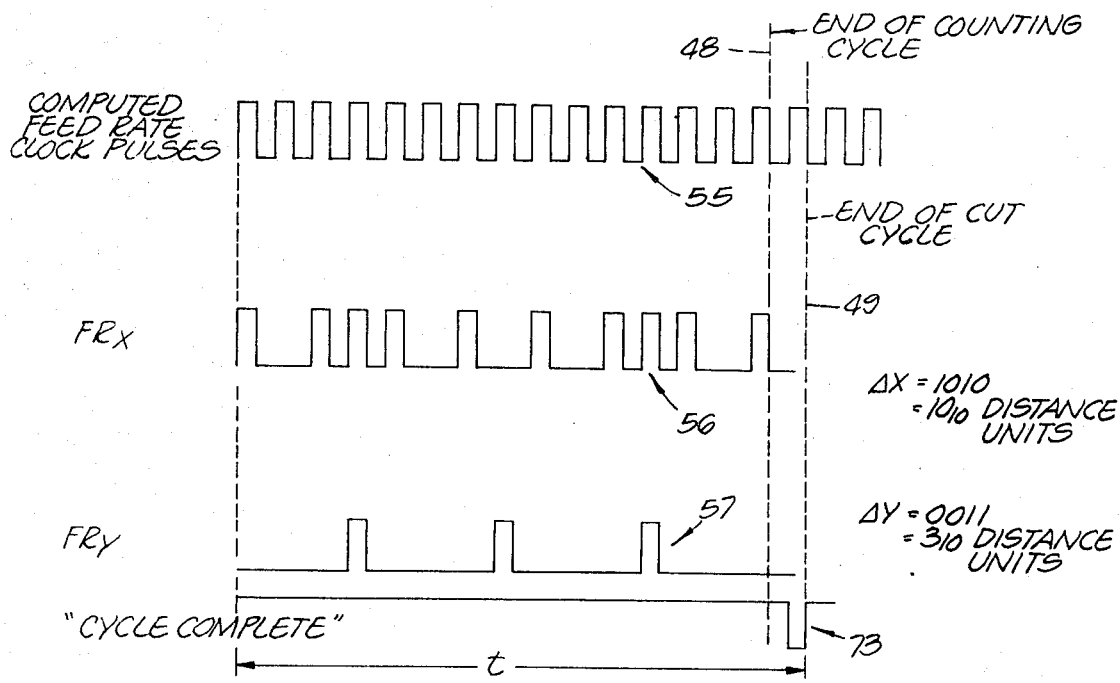
FIG. 3 is a set of waveforms illustrating the X- and Y-axis command pulses used by the system of FIG. 1(a).

The approximately uniform spacing of the FRx and FRy command pulses produced by command pulse generator 51 is illustrated in FIG. 3. In that figure, waveform 55 represents a train of feed rate clock pulses supplied to command pulse generator 51 along line 52 at a uniform rate of 16 pulses per time $t$. By way of example, $\Delta X$ represents in binary form a distance of 10 units, while $\Delta Y$ represents in binary form a distance of 3 units. Waveform 56 illustrates that 10 approximately uniformly spaced FRx pulses will be generated on line 27 in time $t$. In the same period of time, three approximately uniformly space FRy pulses, illustrated by waveform 57, will be generated on line 32.

From the foregoing description, it should be apparent that if feed rate clock pulses are supplied at a constant rate on line 52, the speed of machine tool 15 along the straight line path from P1 to P2 (FIG. 2) will differ depending on the resultant path length $\Delta T = \sqrt{\Delta X^2 + \Delta Y^2}$. That is, the tool speed will differ depending on the particular values of $\Delta X$ and $\Delta Y$. For most applications, it is desirable to have a machine tool 15 move at an approximately constant speed along the resultant path regardless of the slope of length of that path. Contour control computer 50 functions to achieve such constant tool speed regardless of the resultant tool path length $\Delta T$ by adjusting the rate at which feed rate clock pulses are supplied to command pulse generator 51 which in turn adjusts the rate of FRx and FRy pulses supplied to the X-axis control 66 and Y-axis control 67, respectively.

Recall that machine tool 15 is moved through distance $\Delta X$ and $\Delta Y$, parallel respectively to the X- and Y-axes, in the same period of time $t$. Thus the speed $V_t$ along the resultant path $\Delta T$ from P1 to P2 is given by the equation:

$$V_t = (\Delta T/t) = (\sqrt{\Delta X^2 + \Delta Y^2}/t) \quad (1)$$

Since $\Delta T$ is defined for each cut to be made, the time $t$ for performing the cut must be changed in proportion to the resultant distance $\Delta T$ to insure that $V_t$ is constant. Referring again to FIG. 3, it is apparent that the time period $t$ may be changed by correspondingly altering the rate at which computed feed rate clock pulses are supplied to command pulse generator 51. This is accomplished by contour control computer 50.

As will be described in detail below, the number of feed rate clock pulses required to complete a cut cycle (i.e., a move from point P1 to point P2) depends on the number of active stages of a binary counter (counter 99 in FIG. 7) in command pulse generator 51. If M stages are active, $2^M$ pulses are required to complete such a cut cycle. In the example of FIG. 3, four binary counter stages are active in command pulse generator 51, thus $2^M=2^4=16$ pulses are required to complete a cut cycle. The rate at which the $2^M$ computed feed rate clock pulses are supplied determines the time period $t$.

From equation (1) above, it is evident that the time period $t$ required to achieve motion of machine tool 15 at constant speed $V_t$ is given by:

$$t = \Delta T/V_t \quad (2)$$

Thus, the computed feed rate clock pulses preferably should be supplied at a rate $R$ given by:

$$R = 2^M \text{ pulses}/t = [(2^M \text{ pulses})(V_t)/\Delta T] \quad (3)$$

where $V_t$ is the desired preselected constant tool speed. Thus, if feed rate pulses are supplied to command pulse generator 51 at a rate R defined by equation (3) above, the resultant motion of machine tool 15 will be at the desired constant speed $V_t$ regardless of the length $\Delta T$ or slope of the resultant path. The factor $2^M/\Delta T$ may be considered a correction factor useful for controlling the rate at which computed feed rate clock pulses are supplied to command pulse generator 51. In contour control computer 50, a corresponding correction factor is derived by analysis of the command pulses FRx and FRy produced by generator 51; this correction factor is used to control the rate of the feed rate clock pulses on line 52.

To supply computed feed rate clock pulses at the appropriate rate, contour control computer 50 (FIGS. 1(a) and 1(b)) includes a feed rate clock 58 which provides a train of clock pulses along a line 59 at a constant rate related to the maximum tool speed permitted by the system. A programmed feed rate corrector 60, described in detail hereinbelow in conjunction with FIG. 13, initially modifies the rate of the pulses from clock 58 in accordance with programmed feed rate information received on a line 61. This programmed feed rate information is provided to the system from tape reader 40 or other data inputs 44, via data distributor 41, and may be in the format specified by the Electronic Industries Association (EIA) Standard RS–274–A.

The rate of the clock pulses provided on a line 62 from programmed feed rate corrector 60 further is modified by a path length compensator 63 and a position of "first 1" compensator 64 both described in detail hereinbelow in conjunction with FIGS. 9 through 12. Compensators 63 and 64 function to establish the rate of the computed feed rate pulses on line 52 in accordance with the resultant path length $\Delta T$, so that the FRx and FRy pulses produced by command pulse generator 51 are at a rate appropriate to cause motion of machine tool 15 at a preselected substantially constant speed $V_t$.

A manual override control 65 cooperates with feed rate clock 58 to permit operator control of the speed of machine tool 15, overriding the programmed feed rate information supplied from data distributor 41. Such manual override is of value, for example, when the performance characteristics of the tool actually in use are such that operation at the programmed speed would cause damage to the tool. Conversely, a particular tool may cut most efficiently at a speed higher than that programmed; the operator can provide such higher speed operation by use of manual override control 65.

Stop Milling and Go Milling

Figure 4:
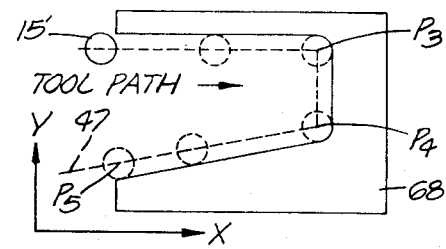
FIG. 4 is a diagram illustrating "stop milling" of a workpiece.

The contour control system of FIG. 1(a) and 1(b) will facilitate machine tool operation in either the "stop milling" or "go milling" mode of operation. In "stop milling" the cutting tool is stopped after performing each straight line cut, prior to executing a turn, so that a minimum over-cutting of material results. An example of this type of milling is shown in FIG. 4. In this figure, a workpiece 68 is being milled by a cutting tool 15'; the operation involves three consecutive straight line cuts, with the machine tool being stopped between each cut. Thus the initial cut is parallel to the X-axis and terminates at point P3, at which point tool 15' is stopped prior to continuing along the new path from point P3 to point P4 parallel to the Y-axis. Tool 15' again is stopped at point P4 prior to continuing on the final, sloping path toward point P5.

Figure 5:
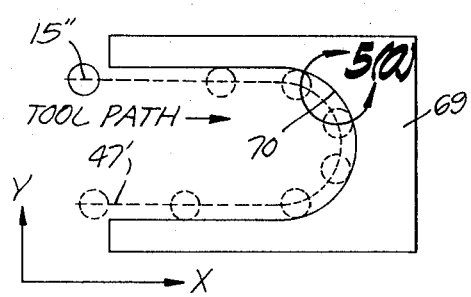
FIG. 5 is a diagram illustrating "go milling" of a workpiece.
Figure 5A:
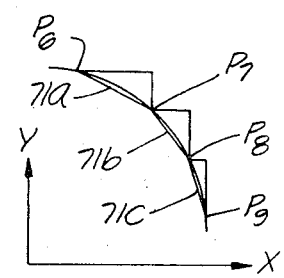
FIG. 5a illustrates the manner in which a curved portion of the workpiece of FIG. 5 may be approximated by a series of straight line segments.

"Go milling" is most applicable to milling operations which require the cutting of continuous curves such as that illustrated in FIG. 5. In this illustration, a machine tool 15'' is being used to mill a curved opening in a workpiece 69. Under control of the system of FIG. 1(a) and 1(b), such a curve is approximated by a series of straight line segments, as illustrated in FIG. 5a. Here, curve 70 is approximated by straight line segments 71a extending from point P6 to point P7, 71b extending from P7 to P8, and 71c extending from P8 to P9. The length of each of these straight line segments 71a, 71b, 71c depends on the required tolerance of the finished part. The higher the accuracy, the smaller the straight line increments required, especially at that portion of the curve where the rate of change per linear distance is highest. To insure a smooth continuity between the programmed increments, it is necessary to keep machine tool 15' in motion until milling of the curve has been completed; the tool is not stopped after each straight line cut segment.

During either stop or go milling operation, command pulse generator 51 (FIG. 1(b)) produces a "cycle complete" signal on a line 72 when production of the command pulses for each straight line cut segment has been completed. This "cycle complete" signal, which is typified by waveform 73 in FIG. 3, is used to control the transfer of ΔX and ΔY data from Δ registers 38 and 39, and to reset command pulse generator 51 and compensators 63 and 64.

For "stop milling" operation, the ΔX and ΔY values for the straight line cut segment being performed may be maintained in Δ registers 38 and 39 during performance of the cut. The "cycle complete" signal then may be used to initiate advance of tape reader 40 and to load the ΔX and ΔY data for the next cut segment first into Δ registers 38 and 39 and thence into command pulse generator 51. During this tape reader advance and data transfer, no command pulses are produced, and machine tool 15 is at rest; production of FRx and FRy pulses for the next cut segment is initiated after completion of the data transfer.

For "go milling" operation, as soon as command pulse generator 51 has completed providing the FRx and FRy pulses for one straight line cut segment, it immediately begins to produce the command pulses for the next seccessive straight line cut segment. In this mode of operation, while one cut segment is being performed, tape reader 40 advances and Δ registers 38 and 39 are loaded with the ΔX and ΔY data for the next cut segment. Occurrence of the "cycle complete" signal causes the new values of ΔX and ΔY to be transferred into command pulse generator 51 in place of the ΔX and ΔY values for the cut segment just completed. The "cycle complete" signal also resets command pulse generator 51 and immediately initiates generation of the next set of command pulses.

Referring now to FIG. 1(b), in the embodiment illustrated, Δ register 38 comprises twenty binary storage positions, a typical one being designated $38i$, adapted to store a 20-bit binary signal representing ΔX. The bits stored in Δ register 38 run from the lease significant ($2^0$) designated $38a$ to the most significant ($2^{19}$) designated $38n$. Similarly, Δ register 39 comprises 20 storage positions, a typical one designated $39i$, for storing a 20-bit binary signal representing ΔY. In Δ register 39, the least significant ($2^0$) storage position is identified $39a$ and the most significant ($2^{19}$) storage position is identified $39n$.

The number of storage positions in Δ registers 38 and 39 is related to the maximum permissible length of a single straight cut segment performed by machine tool 15. For example, in a system wherein each FRx command pulse results in motion of machine tool 15 through a distance increment of 0.0001 inch parallel the X-axis, a Δ register 38 having 20 binary storage positions $38i$ is capable of storing a ΔX signal having a value between 0 and ($2^{20}-1$), representing an X-axis cut length component between 0 and approximately 105 inches. Similarly, a Δ register 39 having 20 binary storage positions $39i$ is capable of storing ΔY signals representing distances between 0 and ($2^{20}-1$) incremental units of distance.

Command Pulse Generator (Interpolator)

Figure 6:
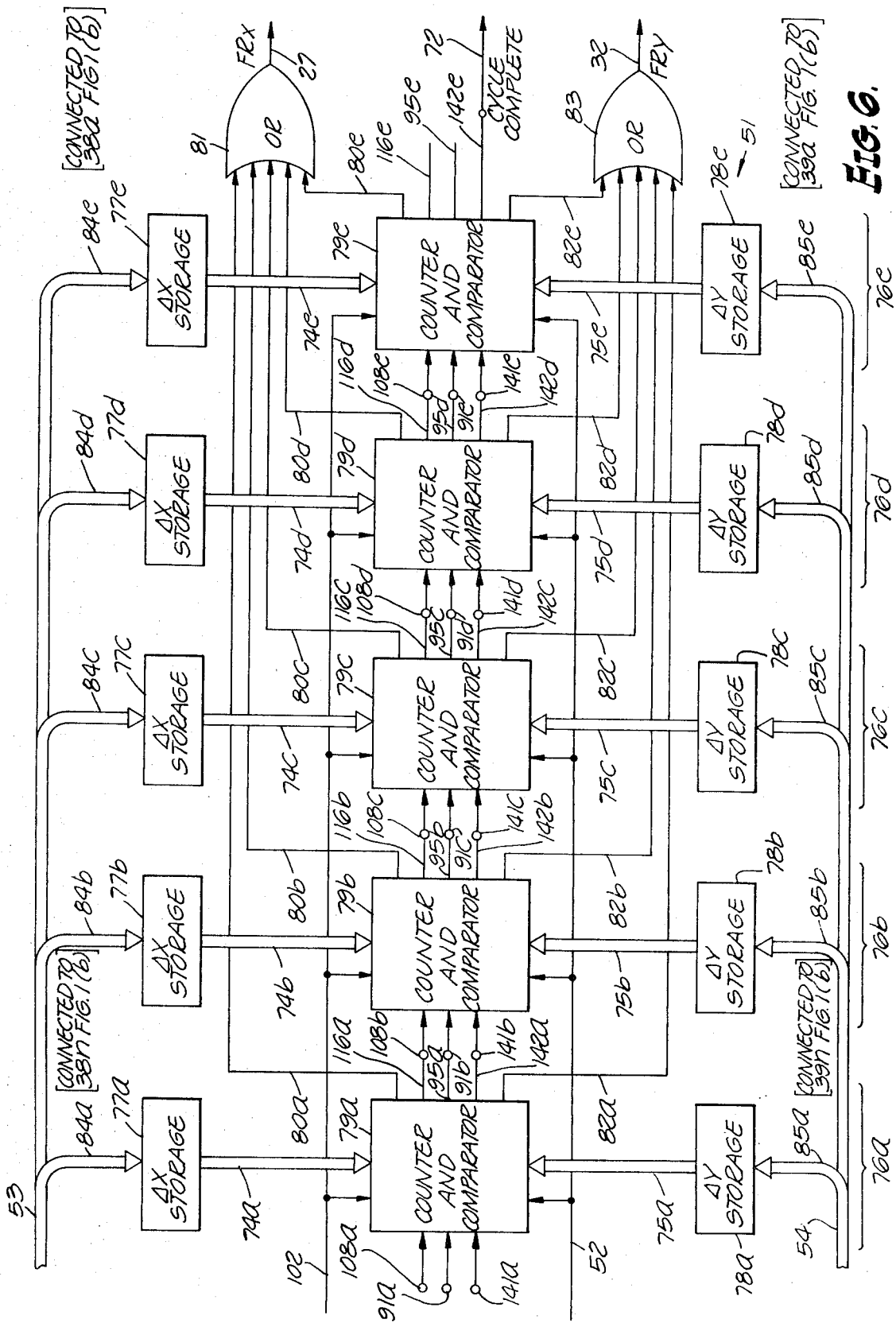
FIG. 6 is an electrical block diagram of the contour control computer portion of the system of FIG. 1(b); the diagram shows the modular configuration of the command pulse generator used in the computer.
Figure 7:
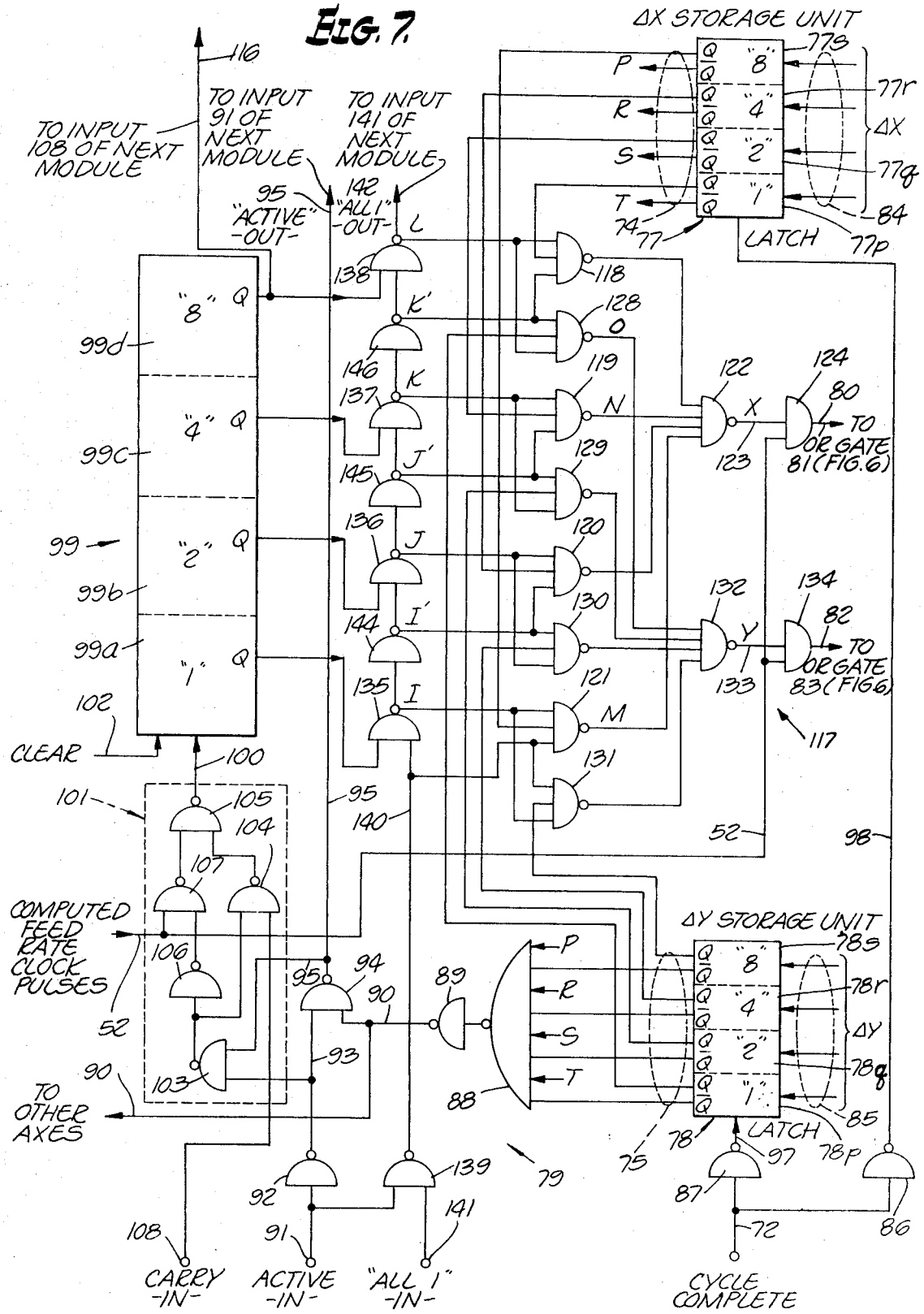
FIG. 7 is an electrical schematic diagram of a typical module of the command pulse generator shown in FIG. 6.

Command pulse generator 51, in the embodiment of FIG. 6, is divided into five identical modules 76a, 76b, 76c, 76d and 76e. One such module is described in detail hereinbelow in conjunction with FIGS. 7 and 8. In FIG. 7, a typical module contains a four bit ΔX storage unit 77, a four bit ΔY storage unit 78, and a counter and comparator unit 79. In FIG. 6, the ΔX storage units associated with modules 76a-76e respectively are designated 77a-77e. Similarly, the ΔY storage units associated with modules 76a-76e respectively are designated 78a-78e and the counter and comparator units associated with modules 76a-76e respectively are designated 79a-79e. In FIG. 7, each of the units 77, 78 and 79 correspond to each of like-numbered units of FIG. 6 for each of the postscripts a through e.

Each of counter and comparator units 79a-79e (FIG. 6) functions to provide on a corresponding one of lines 80a-80 a number of command pulses determined by the contents of the corresponding ΔX storage unit 77a-77. An OR gate 81 receives as inputs each of the lines 80a-80e and provides as an output on line 27 the FRx command pulses used to direct operation of X-axis drive means 30, FIG. 1(b). Similarly, each of counter and comparator units 79a-79e functions to provide on a corresponding one of lines 82a-82e a number of command pulses determined by the content of the corresponding ΔY storage unit 78a-78e. An OR gate 83 combines the outputs on each of lines 82a-82e and provides as an output on line 32 the FRy command pulses used to direct operation of Y-axis drive means 31, FIG. 1(b).

For a particular cut segment, the ΔX and ΔY cut length components both may be considerably shorter than the maximum length permitted by the storage capacity of Δ registers 38 and 39. In such case many high order storage positions in both of Δ registers 38 and 39 will contain only binary 0 bits. In such instance, it is unnecessary for all of modules 76a–76e to be active. Accordingly, command pulse generator 51 includes means (described in conjunction with FIG. 7 below) for determining which one of modules 76a–76e is associated with the "first 1," that is, with the most significant "1" bit in either of the ΔX and ΔY representations. This one module, herein called the "first active module," then receives the computed feed rate clock pulses supplied on line 52. All command pulse generator 51 modules of greater significance than the first active module are inactive; the computed feed rate clock pulses automatically by-pass these inactive modules.

To illustrate the "zero by-pass" operation of command pulse generator 51, assume that ΔX and ΔY have the values given in Example I below:

EXAMPLE I

```
                "first 1"
                   ↓
X=0000 0000 0000 | 110 | 0 1000=200 FRx command pulses=.02 in.
Y=0000 0000 0000 | 011 | 0 0100=100 FRy command pulses=.01 in.
                 └─────┘
                  Three
                  digit
                  group
```

In this example, ΔX is larger than ΔY, and the most significant "1" bit in ΔX (i.e., the "first 1") has the significance $2^7$. Thus, referring to FIG. 1(b), the "first 1" will be supplied via the $2^7$ storage position 38j of Δ register 38. Similarly, the most significant "1" bit in ΔY has the significance $2^6$, and hence will be supplied via the $2^6$ storage position 39b of Δ register 39. As a result, in Δ register 38 all storage positions having significance greater than $2^7$ (that is, the storage positions of significance $2^8$ through $2^{19}$), will contain only "0" bits. Similarly, the storage positions of significance $2^7$ through $2^{19}$ in Δ register 39 will contain only "0" bits. Accordingly, with reference to FIG. 6, for Example I, module 76d of command pulse generator 51 is the "first active module" and modules 76a, 76b, and 76c all are inactive. In this case, computed feed rate clock pulses supplied on line 52 by-pass modules 76a, 76b, and 76c and are fed directly to first active module 76d.

Typical Command Pulse Generator Module

Referring now to FIG. 7 there is shown an electrical block diagram of typical module 76 of command pulse generator 51. Typical module 76 includes a counter and comparator 79, a ΔX storage unit 77 and a ΔY storage unit 78. Each of modules 76a–76e (FIG. 6) is identical to module 76 shown in FIG. 7, differing only with respect to which bits of the ΔX and ΔY representations (from registers 38 and 39 of FIG. 1(b)) are received by the module. Thus, e.g., should module 76 (FIG. 7) correspond to module 76d of FIG. 6, the four bits of ΔX information having significance $2^4$ through $2^7$ would be supplied to ΔX storage unit 77d via a channel 84d from the corresponding four storage positions 38j of Δ register 38 of FIG. 1(b). Similarly, the four bits of ΔY information having significance $2^4$ through $2^7$ would be supplied to the ΔY storage unit 78d via a channel 85d from the corresponding four storage positions 39(b) of Δ register 39 of FIG. 1(b).

Each ΔX storage unit 77 (FIG. 7) itself comprises four binary storage positions 77p, 77q, 77r and 77s, each of which may comprise a flip-flop having Q and $\bar{Q}$ outputs. Note that position 77p contains the least significant ΔX bit stored by unit 77. Thus, e.g., in module 76d storage position 77p would store the "$2^4$" bit of ΔX, while storage position 77s would store the "$2^7$" bit of ΔX. Note that the four storage positions 77p through 77s store binary bits having weighted values. The bit stored in position 77p has a significance ($2^4$), 77q a significance $2^5$, 77r a significance $2^6$, and 77s a significance $2^7$.

Similarly, ΔY storage unit 78 comprises four binary storage positions 78p–78s containing bits having weighted values. In module 76d, positions 78p through 78s store the ΔY bits having significances $2^4$ through $2^7$, respectively.

As shown in FIG. 7, a NAND gate 86 provides a latch signal on line 98 to ΔX storage unit 77 upon occurrence of a "cycle complete" signal on line 72. Similarly, a NAND gate 87 provides a corresponding latch signal on line 97 to ΔY storage unit 78. These latch signals from NAND gates 86 and 87 cause the data stored in Δ registers 38 and 39 respectively to replace the old values of ΔX and ΔY previously stored in storage units 77 and 78 with the values appearing on lines 84 and 85, respectively. In this manner, new ΔX and ΔY values are transferred to contour control computer 50 (FIG. 1(b)) prior to the initiation of each cut cycle.

Referring still to FIG. 7, a pair of NAND gates 88 and 89 are used to recognize whether any one bits are stored in ΔX storage unit 77 or ΔY storage unit 78. To accomplish this, the $\bar{Q}$ outputs of the eight storage positions 77p–77s and 78p–78s comprise the inputs to eight-input NAND gate 88. Since the $\bar{Q}$ output of a particular storage position will be true only if a binary zero is stored in that position, all inputs in NAND gate 88 will be true, and hence the output of NAND gate 88 will be false, only if all storage positions 77p–77s and 78p–78 contain binary zeros. The output of NAND gate 88 is inverted by NAND gate 89, thereby supplying on a line 90 a signal which is true only if there are no binary ones stored in either ΔX storage unit 77 or ΔY storage unit 78. In a system controlling tool motion along more than two axes, line 90 would be connected to a corresponding one bit recognition circuit (not shown) for another axes.

Counter and comparator 79 includes an "active in" terminal 91 which receives an "active" signal from the preceding command pulse generator 51 module (i.e. the module of next higher significance in the modules of the group 76a to 76e). In the example where FIG. 7 represents module 76d, the next higher module is module 76c. This "active" signal is true only if the preceding module is active; otherwise, the "active" signal is false. The "active in" terminal 91a of module 76a always is false.

The "active" signal received at terminal 91 (see FIG. 7) is inverted by a NAND gate 92, to provide via a line 93 a first input to a NAND gate 94. NAND gate 94 also receives as an input the signal on line 90. Since the signal on line 93 is true only if the preceding module is inactive, and since the signal on line 90 is true only if no binary ones are contained in ΔX and ΔY storage units 77 and 78, the output of NAND gate 94 on a line 95 will be false only if the module shown itself is inactive. If the previous module of the group 76a to 76e is active, or if the previous module is inactive but at least one binary one is contained in ΔX storage unit 77 or ΔY storage unit 78 (i.e., if the illustrated module if the "first active" module), the output of NAND gate 94 will be true. Thus, the output of NAND gate 94, on a line 95, comprises the "active" signal which is fed to the "active in" terminal of the next module. For the example where FIG. 7 represents module 76(d) of FIG. 6, line 95 (FIG. 7) represents line 95d (FIG. 6) and is connected to input 91e (FIG. 6) of module 76(e) (FIG. 6).

For the ΔX and ΔY values given in Example I above, command pulse generator modules 76a, 76b and 76c (FIG. 6) are inactive, hence each of these will supply a false "active out" signal on lines 95a, 95b, 95c, respectively, corresponding to line 95 of FIG. 6. Module 76d will provide a true "active" signal to the "active in" terminal 91e of module 76e. A true "active" signal is produced by module 76e, but being the last module, there is no subsequent module to receive this signal and therefore that signal is not employed.

Figure 9:
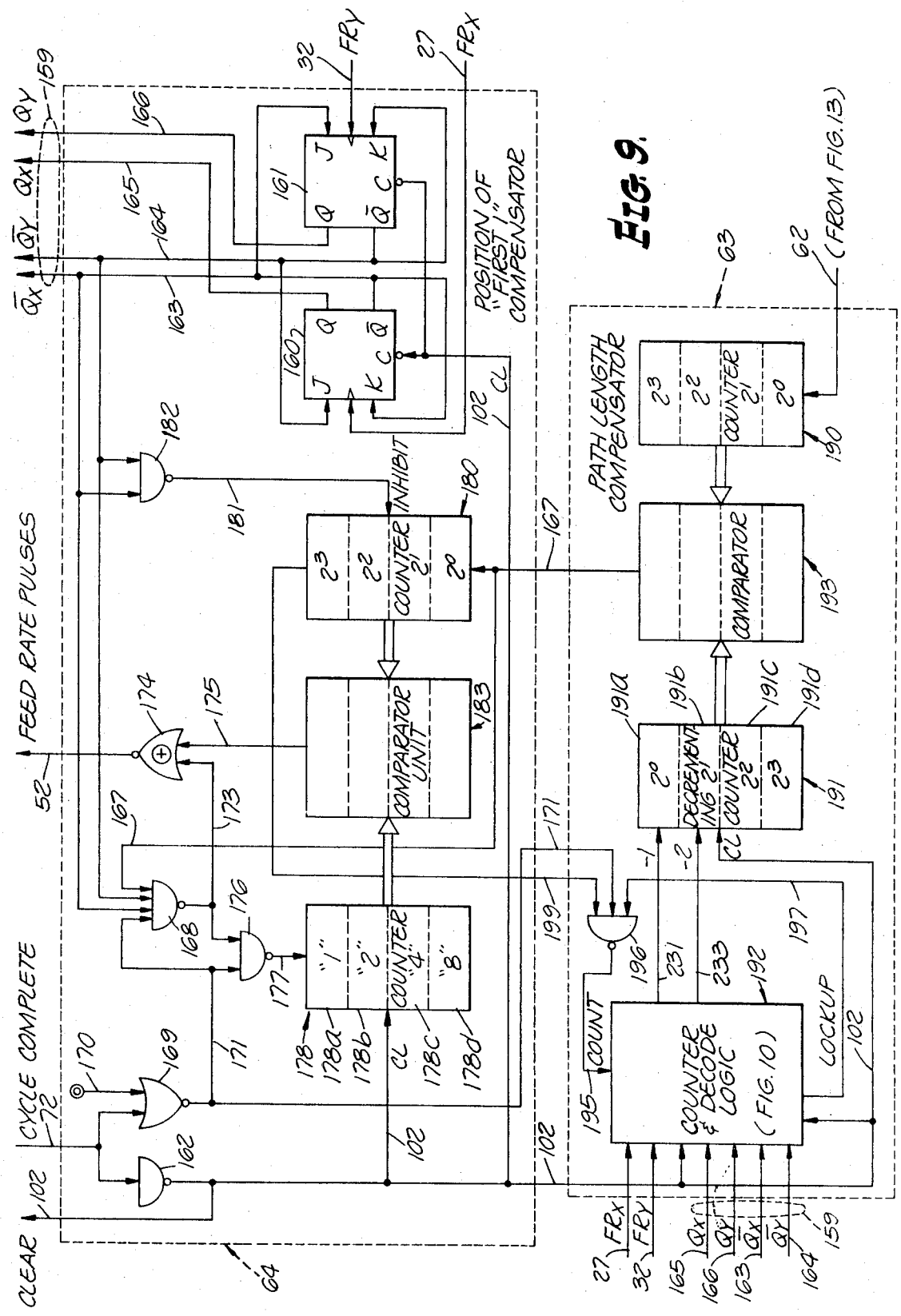
FIG. 9 is an electrical block diagram of the position of "first 1" compensator and path length compensator portions of the contour control computer shown in FIG. 6.

Still referring to FIG. 7, each counter and comparator unit 79 contains a binary counter 99 having four stages 99a, 99b, 99c and 99d, in order of increasing significance. Typically, counter 99 is advanced by the negative-going transition of count pulses supplied on a line 100 from a logic circuit 101. Thus, stage 99a changes state once for each count pulse on line 100, stage 99b changes stage once for each two count pulses on line 100, stage 99c changes state once for each four count pulses on line 100, and stage 99d changes state once for each eight count pulses on line 100. Correspondingly, stages 99a–99d are identified in FIG. 7 by the weighted values "1,""2,""4", and "8", respectively. Counter 99 may be reset to zero by a "clear" signal supplied on a line 102, as shown in FIGS. 6 and 9, which is derived from the position of "first 1" compensator 64 (FIG. 9), by inverting the cycle complete line 72 from the module 76e (FIG. 6) "all 1" out line 142e.

The source of count pulses on line 100 in a particular module of command pulse generator 51 depends on whether or not it is the first active module of the group 76a to 76e. In the first active module of that group, counter 99 receives computed feed rate pulses provided via line 52 from FIG. 16. If the preceding module also is active, counter 99 receives as count pulses the "carry" pulses from the preceding module at terminal 108. If the module is inactive, counter 99 receives no count pulses. The source of count pulses on line 100 is controlled by logic circuitry 101 in response to the state of the inverted "active in" signal on line 93 and the state of the "active out" signal on line 95 of the module containing counter 99.

Referring to FIG. 7, if the module illustrated is the first active module, the "active in" signal received at terminal 91 will be false, hence the signal on line 93 will be true. Moreover, the signal on line 90 will be true, since at least one binary 1 (i.e. the "first 1") will be present in either ΔX storage unit 77 or ΔY storage unit 78. In this instance, the "active out" signal on line 95 also will be true. Since the signals on lines 93 and 95 provide inputs to NAND gate 103 in logic circuitry 101, the output of NAND gate 103 will be false. This false output provides an input to a NAND gate 104, thus the output of NAND gate 104 will be true regardless of the true or false level of the other input to NAND gate 104 from terminal 108, thereby providing a true or enabling input to a NAND gate 105, the output of which is connected to line 100. The false output from NAND gate 103 is inverted by a NAND gate 106 to provide a true or enabling input to a NAND gate 107. NAND gate 107 also receives as an input the computed feed rate clock pulses supplied via line 52. The feed rate clock pulses are inverted a first time by enabled NAND gate 107, and again inverted by enabled NAND gate 105. Thus, the computed feed rate clock pulses supplied via line 52 are provided on line 100 to counter 99.

In modules which are inactive, the signal on line 95 is false, hence causing the output of NAND gate 103 to remain true and the output of NAND gate 106 to remain false. The false output of NAND gate 106 inhibits NAND gate 107 from supplying feed rate clock pulses to NAND gate 105. Although the true output of NAND gate 103 enables NAND gate 104, no carry pulses are received from the preceding module (which also is inactive), hence no count pulses are supplied to NAND gate 105 or to counter 99.

Figure 8:
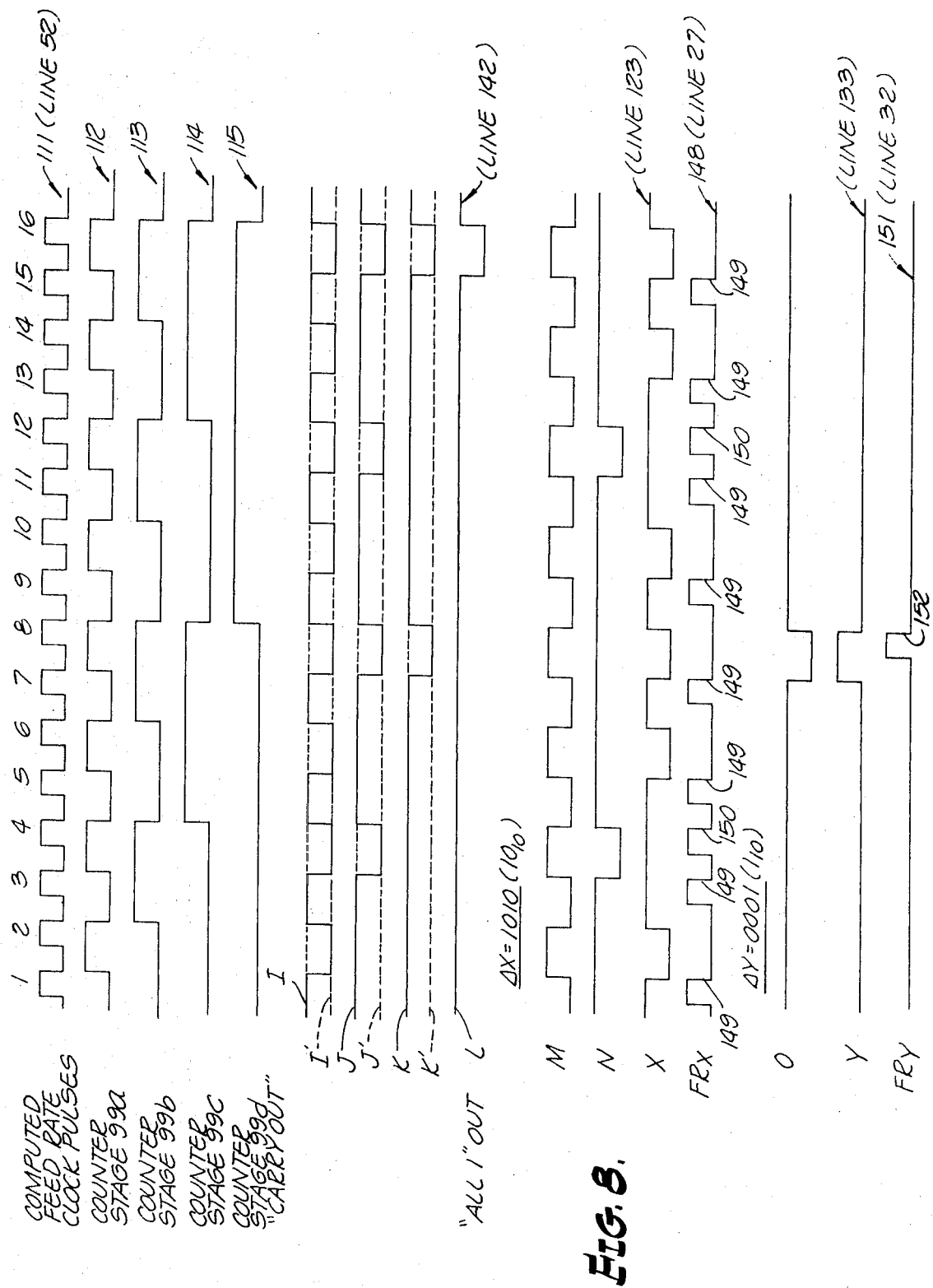
FIG. 8 is a set of waveforms illustrating operation of the command pulse generator module shown in FIG. 7.

Waveforms illustrating operation of counter 99 are shown in FIG. 8. Referring thereto, waveform 111 represents the feed rate clock pulses present on line 52 and hence on line 100 of the first active module of command pulse generator 51. NOte that the feed rate clock pulses shown in waveform 111 occur at a constant rate and have not been corrected in rate to compensate for the resultant path length of the cut being produced; the pulses are shown in this form in FIG. 8 to simplify the operational description of the module 76 shown in FIG. 7. Rate correction of the computed feed rate clock pulses is discussed in detail hereinbelow in conjunction with FIGS. 9-13.

Waveforms 112, 113, 114 and 115 (FIG. 8) respectively represent the states of stages 99a, 99b, 99c and 99d of counter 99 (FIG. 7). In the embodiment illustrated, counter stage 99a changes state upon occurrence of each negative going transition of the feed rate clock pulses (waveform 111). Similarly, each succeeding counter stage changes state upon occurrence of a negative-going transition of the preceding state. The "carry out" signal provided by module 76 on a line 116 (FIG. 7) corresponds to the state of stage 99d and thus also is illustrated by waveform 115. Note that the negative-going transition of this "carry out" signal (waveform 116) occurs at the trailing edge of the 16th feed rate clock pulse received on line 100; this negative-going transition serves to advance counter stage 99a in the next module of command pulse generator 51.

Recall that the function of command pulse generator 51 is to provide a set of FRx and FRy command pulses equal in number to the value of ΔX and ΔY representations supplied by Δ registers 38 and 39 (FIG. 6) and stored in the ΔX and ΔY storage units 77 and 78 of the modules comprising generator 51. For each of modules 76a–76, this function is accomplished by comparator logic generally indicated 117 (FIG. 7) in conjunction with counter 99 and ΔX and ΔY storage units 77 and 78.

Referring to FIG. 7, comparator 117 includes four NAND gates 118, 119, 120 and 121 each of which receives as one input the Q output from a corresponding one of storage positions 77p, 77q, 77r and 77s in ΔX storage unit 77. The outputs of NAND gates 118–121 provide the inputs to a NAND gate 122, the output of which provides via a line 123 one input to an AND gate 124.

Similarly, for the Y-axis, comparator 117 includes four NAND gates 128, 129, 130 and 131 each of which receives as one input the Q output from a corresponding one of storage positions 78p, 78q, 78r and 78s of ΔY storage unit 78. The outputs of NAND gates 128–131 provide the inputs to a NAND gate 132, the output of which provides, via a line 133, one input to an AND gate 134.

Comparator logic 117 further comprises four two-input NAND gates 135, 136, 137 and 138, each of which receives as a first input a signal indicative of the contents of the corresponding counter stage 99a, 99b, 99c and 99d. As described below, the respective second input to each of NAND gates 135–138 is a signal which is true only when all preceding active counter stages are true.

As a second input, NAND gate 135 receives the output of a NAND gate 139 via a line 140. NAND gate 139 (FIG. 7) itself receives as a first input the "active in" signal from terminal 91. The second input to NAND gate 139 is an "all 1" signal from the preceding active module received via an "all 1" input terminal 141. In the first active module, the signal at "active in" terminal 91 will be false, thus the output from NAND gate 139 will be true. For other active modules, the "active in" signal will be true. This will enable NAND gate 139 to invert the "all 1" input signal received at terminal 141. As described below, the "all 1" input signal is false only when all counter stages of all preceding active modules are true, thus NAND gate 135 receives as its second input a signal which is true when all preceding active counter stages are true.

When the signal on line 140 is true, the output of NAND gate 135 comprises a signal I (illustrated by waveform I in FIG. 8) which is the inverse of the contents of counter stage 99a (illustrated by waveform 112 in FIG. 8). This signal I is inverted by a NAND gate 144 to provide a signal I' (illustrated by waveform I' in FIG. 8) as one input of NAND gate 136. Comparison of waveform I' with waveform 112 indicates the two to be identical; that is the I' input to NAND gate 136 is true whenever counter stage 99a is true.

The output of NAND gate 136 (FIG. 7) is a signal J (see waveform J in FIG. 8) which is false only when counter stages 99a and 99b both are true. Signal J is inverted by a NAND gate 145 to provide to NAND gate 137 a signal J' (see waveform J' in FIG. 8) which is true only when counter stages 99a and 99b both are true. When signal J' and the contents of counter stage 99c both are true, the output signal K (see waveform K in FIG. 8) from NAND gate 137 is false. This signal K is inverted by a NAND gate 146 to provide to NAND gate 138 signal K' (see waveform K' in FIG. 8) which is true only when counter stages 99a, 99b and 99c all are true.

NAND gate 138 produces on a line 142 an output signal L (see waveform L in FIG. 8) which is false only when counter stages 99a, 99b, 99c and 99d all are true. This signal L comprises the "all 1" output signal from the module illustrated, and is supplied to the "all 1" input terminal, like terminal 141 of FIG. 7, of the next module of command pulse generator 51. Moreover, the "all 1" out signal from last module 76e comprises the cycle complete signal on line 72 for command pulse generator 51. Thus, line 142 (FIG. 7) from the last module 76e corresponds to cycle complete line 72 shown in FIGS. 1 and 6.

In summary, the "all 1" signal on line 140 at the output of gate 139 (FIG. 7) is true if the module illustrated is the first active module of the group 76a to 76e (FIG. 6), or if all counter stages in all preceding active modules are set true. Each of signals I, J, K and L is false only when the corresponding counter stage 99a, 99b, 99c and 99d is true and all preceding active counter stages are true. Each of the signals I', J', and K' is true only when all active counter stages preceding the respective counter stages 99b, 99c and 99d are true. These various signals are used, in a manner described below, to enable gates 118–121 and 128–131 at times appropriate for generation of the FRx and FRy command pulses.

Command Pulse Generation

Generation of command pulses by comparator logic 117 (FIG. 7) is illustrated in conjunction with FIG. 8 for the ΔX and ΔY values given by the following Example II:

EXAMPLE II

ΔX = $1010_2$ = ($10_{10}$) = contents of Δx storage unit 77
ΔY = $0001_2$ = ($1_{10}$) = contents of ΔY storage unit 78

For this example, ΔX storage unit 77 contains binary ones in storage positions 77q and 77s, and contains binary zeros in positions 77p and 77r. Similarly, Y storage unit 78 contains a binary one in position 78p and binary zeros in positions 78q, 78r and 78s. For simplicity of description, the corresponding waveforms of FIG. 8 assume that the first active module is illustrated.

For Example II, the contents of ΔX storage register 77 is such that NAND gates 119 and 121 are enabled. Storage positions 77p and 77r provide false inputs to NAND gates 118 and 120, causing the outputs of NAND gates 118 and 120 to remain true. NAND gate 121, which is enabled by the binary one contained in the storage position 77s of greatest significance in ΔX storage unit 77, also receives as inputs the I signal from NAND gate 135 and the true output from NAND gate 139. Thus, the output M (see waveform M of FIG. 8) of NAND gate 121 is a signal which is false each time counter stage 99a is false. NAND gate 119 is enabled by the binary one contained in storage position 77q and also receives as inputs the J' and K signals. Thus, NAND gate 119 produces an output signal N (see waveform N of FIG. 8) which is false each time counter stage 99c is false and counter stages 99a and 99b of lesser significance are true.

The outputs of NAND gates 118, 119, 120 and 121 provide the four inputs to NAND gate 122. For Example II, the outputs from NAND gates 118 and 120 remain true, hence whenever the output of either NAND gate 119 or 121 is false, the signal X (see waveform X in FIG. 8) obtained on line 123 at the output of NAND gate 122 is true. This signal X is combined with computed feed rate clock pulses on line 52 (see waveform 111 in FIG. 8) in AND gate 124 to provide 10 X-axis command pulses on line 80 as represented by waveform 148 in FIG. 8. These command pulses on line 80 are supplied to FRx line 27 via OR gate 81 (FIG. 6).

Of the 10 FRx pulses generated by logic 117 and represented by waveform 148, eight pulses (each designated 149 in FIG. 8) were enabled by the binary one bit contained in storage position 77s (having weighted value "8"), and two pulses (each designated 150 in FIG. 8) were enabled by the binary one bit contained in storage position 77q having weighted value "2." Note also that the weighted value "8" pulses 149 were gated by, and hence occurred in unison with computed feed rate clock pulses 1, 3, 5, 7, 9, 11, 13 and 15, as indicated by the corresponding ordinal identification above waveform 111 in FIG. 8. Similarly, the weighted value "2" pulses 150 were gated by computed feed rate clock pulses 4 and 12. Further note in FIG. 8 that the 10 FRx command pulses represented by waveform 148 are appropriately uniformly spaced over the time period taken to supply 16 computed feed rate clock pulses to counter 99.

Operation of logic circuitry 117 for generation of the Y-axis command pulses specified by the ΔY value of Example II also is illustrated by the waveform of FIG. 8. Because a binary one is present only in storage position 78p of ΔY storage unit 78 (FIG. 7), NAND gates 129, 130 and 131 each receive false inputs from corresponding storage positions 78q, 78r and 78s. As a result, the outputs of NAND gates 129, 130 and 131 provide three true inputs to NAND gate 132.

The presence of a binary one in storage position 78p enables NAND gate 128, which gate also receives as inputs the signals K' and L. The K' signal is true only when all stages 99a, 99b and 99c of counter 99 are true. The L signal is true when counter stage 99d is false. Thus, the output signal 0 (see waveform 0 in FIG. 8) from NAND gate 128 is false only when counter stage 99d is false and all preceding counter stages are true.

The signal 0 is inverted by NAND gate 132 to provide on line 133 a signal Y (see waveform Y of FIG. 8) which provides one input to AND gate 134. The computed feed rate clock pulses on line 52 provide the other input to AND gate 134. The output of AND gate 134, on line 82, is represented by waveform 151 in FIG. 8 and comprises a single Y-axis command pulse 152 which occurs in uniform with the 8$^{th}$ computed feed rate clock pulse supplied via line 100 to counter 99.

Thus, in general, an X-axis command pulse is generated on line 80 each time the $i^{th}$ stage (as counted from the stage 99a of least significance) of counter 99 is false, and all active counter stages of lesser significance are true, and the contents of the corresponding $i^{th}$ storage position of ΔX storage unit 77, as counted from the storage position 77s of greatest significance, is true. Similarly, for the Y-axis, a command pulse is generated on line 82 each time the $i^{th}$ stage (as counted from stage 99a) of counter 99 is false, and all active counter stages of lesser significance are true, and the contents of the corresponding $i^{th}$ storage position of ΔY storage unit 78, as counted from the storage position 78s of greatest significance, is true.

In the embodiment of FIG. 6, command pulse generator 51 comprises five modules 76a–76e each of which includes four counter stages 99a–99d (FIG. 7). Thus, command pulse generator 51 may be characterized as including a counter of N = 5×4 = 20 counter stages. From the above description, a binary one in the $j^{th}$ position of ΔX and ΔY, as counted from the position of least significance (i.e., from the position of significance 2⁰) will result in generation of $2^{j-1}$ command pulses for the corresponding axis. These $2^{j-1}$ command pulses will be enabled by the (N−j+1)th counter stage, as counted from the counter stage 99a of least significance in the first module 76a of command pulse generator 51. Since some modules may be inactive, if n represents the number of active modules, then M = 4n represents the number of active counter stages in command pulse generator 51. In this instance, the $2^{j-1}$ command pulses required by a binary one in the $j^{th}$ position of ΔX or ΔY will be enabled by the (M−j+1)th active counter stage, as counted from the counter stage 99a of least significance in the first active module.

By way of illustration, in Example I above, the binary one in position j=8 of ΔX and having significance $2^{j-1}$ =2⁷ will result in production of 2⁷ FRx command pulses by generator 51. These pulses will be enabled by the (N−j−1)=(20−8−1) =13$^{th}$ counter stage of command pulse generator 51, that is, by counter stage 99a in the fourth module 76d. Since for Example I, module 76d is the first active module, and n=2 modules are active, the 2⁷ FRx command pulses will be enabled by the (m−j+ =1) =(8−8+1)=1$^{st}$ counter stage 99a in first active module 76d. Note that this binary one in position j=8 of ΔX also is the "first 1," that is, the most significant "1" bit in the largest of ΔX and ΔY. Thus counter stage 99a in first active module 76d may be described as the first command pulse enabling counter stage in command pulse generator 51.

Contour Control — "First 1" Compensators

Referring to FIG. 9, path length compensator 63 and position of "first 1" compensator 64 cooperate to provide computed feed rate clock pulses on line 52 at a rate which will effectuate motion of machine tool 15 (FIG. 1(a)) at the preselected, substantially constant speed $V_t$ regardless of the resultant path length ΔT (FIG. 2) of the cut being performed. In particular, compensators 63 and 64 in FIG. 9 provide computed feed rate clock pulses at a rate R=[(2$^M$pulses)(V$_t$)/ΔT] (see equation (3) above) where M corresponds to the number of active counter stages in command pulse generator 51 (FIG. 1(a)).

Referring to FIG. 9, compensator 64, for compensating as a function of the position of the "first 1," includes a pair of flip-flops 160 and 161 both of which are reset to the Q̄ state by the negative-going transition of the clear signal on line 102. The clear signal itself comprises the output of a NAND gate 162 which inverts the "cycle complete" signal present on line 72. Since the "cycle complete" signal (see waveform 73, FIG. 3 or waveform L, FIG. 8) occurs at the end of the counting cycle of command pulse generator 51, flip-flops 160 and 161 both are reset to the Q̄ state at the completion of each cut segment.

The toggle input of flip-flop 160 receives the FRx command pulses on line 27 and the toggle input of flip-flop 161 receives the FRy command pulses on line 32. The $\overline{Q}$ output of flip-flop 160 is connected via a line 163 to the K input of the same flip-flop 160 and to the J input of flip-flop 161. Similarly, the $\overline{Q}$ output of flip-flop 161 is connected via a line 164 to the K input of the same flip-flop 161 and to the J input of flip-flop 160. The Q outputs of flip-flops 160 and 161 are connected respectively to lines 165 and 166.

With the toggling arrangement described, the initial command pulse, i.e., the first command pulse enabled by the "first 1," may occur on either line 27 or line 32 and will set the corresponding one of flip-flops 160 and 161 to the Q state. If initial command pulses should occur simultaneously on lines 27 and 32, both of flip-flops 160 and 161 will be set to the Q state. Subsequent command pulses generated during the same cut cycle do not alter the states of flip-flops 160 or 161.

As noted above, the initial command pulse is enabled by the "first 1," i.e., by the binary one of greatest significance in the largest of ΔX and ΔY. Thus, if the "first 1" occurs in ΔX, the X-axis flip-flop 160 will be set to Q; if the "first 1" occurs in ΔY, the Y-axis flip-flop 161 will be set to Q. If the most significant binary ones of both ΔX and ΔY have the same significance, initial command pulses will occur simultaneously on lines 27 and 32, and flip-flops 160 and 161 both will be set to Q.

The operation of flip-flops 160 and 161 may be illustrated in conjunction with Example I set forth hereinabove. In Example I, the "first 1" occurs in the ΔX and has the significance $2^7$; the bit of corresponding significance in ΔY is a zero. Accordingly, the initial command pulse will occur on FRx command pulse line 27 and will set flip-flop 160 to the Q state. A command pulse will not simultaneously occur on FRy command pulse line 32, so that flip-flop 161 will remain in the $\overline{Q}$ state. Thus, upon occurrence of the initial command pulse, flip-flops 160 and 161 respectively will be set to the Q and $\overline{Q}$ states, indicating that the "first 1" occurred in ΔX and that the bit of corresponding significance in ΔY was a zero. Flip-flops 160 and 161 will remain set to these states until the end of the cut cycle; the states of flip-flops 160 and 161 will not be affected by occurrence of subsequent command pulses on lines 27 or 32.

Referring still to FIG. 9, compensator 64 receives feed rate clock pulses from path length compensator 63 via a line 167. These pulses provide one input to a four input NAND gate 168. The other inputs to NAND gate 168 are provided by the $\overline{Qx}$ and $\overline{Qy}$ signals on lines 163 and 164, and by the output of an OR gate 169 on line 171. The "cycle complete" signal (see waveform 73 in FIG. 3) is false only at the end of a cut cycle. Thus, the output of OR gate 169, on a line 171, is true except upon occurrence of the cycle complete signal at the end of each cut cycle, or when a reset switch 172 is closed, causing the reset signal on line 170 to go false.

At the beginning of a cut cycle, prior to occurrence of the initial command pulse, the three inputs to NAND gate 168 on lines 163, 164 and 171 all are true. This condition enables NAND gate 168 to invert the feed rate clock pulses received on line 167, and to supply these inverted feed rate pulses along a line 173.

The inverted feed rate clock pulses on line 173 provide one input to an EXCLUSIVE OR gate 174. The other input to gate 174, provided via a line 175, is false prior to occurrence of the initial command pulse. EXCLUSIVE OR gate 174 provides a true output if the logical state of both inputs is the same (i.e., both true or both false); gate 174 provides a false output if one input is true and the other false. Thus, prior to occurrence of the initial command pulse, the output of EXCLUSIVE OR gate 174, on line 52, comprises computed feed rate clock pulses inverted with respect to line 173. These computed feed rate clock pulses, which are supplied to command pulse generator 51, correspond in phase and rate to the pulses supplied along line 167 from compensator 63 prior to occurrence of the initial command pulse from data distributor 41, FIG. 1(a).

The signals on line 171 and 173 provide the two inputs to a NAND gate 176, the output of which is fed via a line 177 to a four-stage binary counter 178. Counter 178 is cleared to zero at the end of each cut cycle by the clear signal on line 102. Prior to occurrence of the initial command pulse, the true signal on line 171 enables NAND gate 176 to invert the pulses on line 173, thereby providing on line 177 feed rate clock pulses in unison with the pulses supplied along line 52 to command pulse generator 51. Accordingly, counter stages 178a, 178b, 178c and 178d, respectively having the significance "1", "2", "4", and "8", will be advanced exactly in unison with the corresponding counter stages 99a, 99b, 99c, and 99d (FIG. 7) in the first active module of command pulse generator 51 (FIG. 6).

Upon occurrence of the initial command pulse, one or both of flip-flops 160 and 161 of FIG. 9 will be set to the Q state. The signals on one or both of lines 163 and 164 then will be set false, thereby disabling NAND gate 168. Accordingly, the output of NAND gate 168, on line 173, will remain true between the time of occurrence of the initial command pulse and the end of the cut cycle. When line 173 is true, the output of NAND gate 176 on line 177 is false, thereby preventing advance of counter 178. Thus for the remainder of the cut cycle, the contents of counter 178 will remain unchanged. Only one of the four stages of counter 178 will be set true, that stage indicating which stage of counter 99 (FIG. 7) enabled generation of the initial command pulse.

Operation of counter 178 is illustrated in conjunction with the following Example III:

EXAMPLE III

| | | "First 1" | |
|---|---|---|---|
| X=0000 0000 0000 0 | 110 | 0000 | =.0096 inches |
| Y=0000 0000 0000 0 | 011 | 0000 | =.0048 inches |

Three digit group

With these values of ΔX and ΔY, the initial command pulse will be enabled by counter stage 99b (FIG. 7) in first active module 76d (FIG. 6) and will be gated by the second feed rate clock pulse supplied to command pulse generator 51. The negative-going transition of this second pulse will set counter stage 99b true (see FIG. 8) and counter stage 99a false. Simultaneously, the negative-going transition of the corresponding second feed rate clock pulse on line 177 will set counter stage 178b true and stage 178a false. Thus, subsequent to occurrence of the initial command pulse, only stage 178b of counter 178 will be set true, thereby indicating that counter stage 99b (of first active module 76d) was the first command pulse enabling counter stage in command pulse generator 51.

Position of "first 1" compensator 64 (FIG. 9) also includes another four-stage binary counter 180 which receives as a counting input the feed rate clock pulses supplied on line 167. Counter 180 is set to zero and inhibited from counting by a false "inhibit" signal supplied via a line 181 from a NAND gate 182. NAND gate 182 receives as input the $\overline{Qx}$ and $\overline{Qy}$ signals on respective lines 163 and 164. Prior to occurrence of the initial command pulse, both $\overline{Qx}$ and $\overline{Qy}$ are true, hence the signal on line 181 is false, thereby maintaining counter 180 set to zero and inhibited from counting until occurrence of the initial command pulse.

The contents of counter 178 and 180 are compared by a comparator unit 183 analogous to comparator 117 of FIG. 7. In a preferred embodiment, as explained later, for such eight input pulses received by counter 180, comparator unit 183 produces on line 175 a number of output pulses equal to the weighted value of the stage of counter 178 which is set true. These output pulses will be approximately uniformly spaced over the same period of time taken to supply the eight input pulses on line 167. For example, if the initial command pulse is enabled by counter stage 99b, counter stage 178b, having a weighted value "2," will be set true, and two pulses will be provided on line 175 for each eight pulses supplied via line 167.

During the time that the signal on line 173 remains true, EXCLUSIVE OR gate 174 is enabled to pass without inversion the pulses supplied on line 175. Thus, subsequent to occurrence of the initial command pulse, the output of comparator unit 183 provides, via line 175, gate 174 and line 52, the computed feed rate clock pulses to command pulse generator 51.

If the "first 1" is stored in ΔX storage position 77s or ΔY storage position 78s (FIG. 7) of the first active module of command pulse generator 51, then counter stage 99a of that module is the first command pulse enabling counter stage. In this instance, counter stage 178a is set true and pulses will be provided by compensator 64 on line 52 at one-eight the rate at which feed rate clock pulses are supplied on line 167 (FIG. 9). Since stage 99a enables generation of one command pulse line 80 or 82 for each two pulses received on line 52 (see waveforms 111 and 112, FIG. 8), command pulses enabled by the "first 1" will be generated at a rate one-sixteenth that at which pulses are supplied on line 167 from path length compensator 63. However, if stage 99c is the first command pulse enabling counter stage, counter stage 178c will be set true and compensator 64 will provide pulses on line 52 at a rate which is four-eights the rate at which pulses are received on line 167. Counter stage 99c enables generation of one command pulse for each eight pulses received on line 52. Therefore, command pulses enabled on lines 80 or 82 of FIG. 7 by a "first 1" stored in ΔX and ΔY storage position 77q or 78q will be generated at a rate equal to one-sixteenth times the rate at which pulses are provided along line 167.

Similar analysis indicates that regardless of which stage of counter 99 in the first active module is the first command pulse enabling stage, the command pulses enabled on lines 80 or 82 by that stage will occur at one-sixteenth the rate at which feed rate clock pulses are supplied from path length compensator 63 via line 167. In summary, compensator 64 insures that the rate on lines 80 or 82 at which command pulses enabled by the "first 1" are generated is independent of the position of the "first 1."

As discussed above, equation (3) indicates the desired rate at which pulses are to be supplied to the first active counter stage of command pulse generator 51 to effectuate motion of machine tool 15 at a substantially constant speed $V_t$ regardless of the path length ΔT of the cut being performed. If counter stage 99a in the first active module of generator 51 is the first command pulse enabling counter stage, then compensator 64 applies pulses to this stage via line 52 at one-eighth the rate at which feed rate clock pulses are supplied along line 167. In this instance, it is apparent that path length compensator 63 should provide pulses on line 167 at a rate R' given by equation (4) as follows:

$$R' = [8(2^M \text{ pulses}) (V_t)/\Delta T] \quad (4)$$

where M, $V_t$ and ΔT all are as defined for equation (3) above. Because of the operation of position of "first 1" compensator 64, pulses supplied on line 167 at this rate R' will result in motion of machine tool 15 at speed $V_t$ regardless of which stage of counter 99 is the first command pulse enabling counter stage.

Contour Control — Path Length Compensator

As described in conjunction with FIGS. 9 and 10 below, feed rate clock pulses are supplied on line 167 at the rate R' specified by equation (4) by operation of path length compensator 63. This is accomplished by providing pulses to compensator 63 on a line 62 at a rate R'' numerically equal to 16$V_t$, and then multiplying (in compensator 63) the pulse rate R'' by a factor ½($2^M$/ΔxFT).

The correction factor $2^M$/T may be approximated by assigning the value M=4, corresponding to the number of counter stages in each module of command pulse generator 51. The value ΔT then may be calculated using the three digit group including the "first 1" and the two bits of next lesser significance in the one of ΔX and ΔY containing the "first 1," and the bits of corresponding significance in the other of ΔX and ΔY. In this calculation of ΔT, binary ones occurring in the three digit group are assigned weighted values depending on their significance within the group, as indicated in the following Table I.

TABLE I

|  | "First 1" ↓ |  |  |  |
|---|---|---|---|---|
| Binary digit | 1 | 1 | 1 | 1 |
| Weighted value | 8 | 4 | 2 | 1 |
|  |  | Three digit group |  |  |

The value of ΔT then is determined by computing the square root of the sum of the squares of the sums of the weighted values of the ΔX and ΔY three digit groups. Although the correction factor would be more accurate if additional bits of ΔX and ΔY were included in the calculation of ΔT, the error introduced by these bits of lesser significance offers a negligible contribution to the accuracy of the feed rate calculation.

Calculation of ΔT may be illustrated using the values ΔX and ΔY given in Example I above. In that example, the three digit group in ΔX has the weighted value 8+4=12, and the three digit group in ΔY, has the weighted value 4+2=6. Thus, for Example I, the resultant path length ΔT is approximately equal to $\sqrt{12^2+6^2}=13.4$ distance units, and the theoretical correction factor $2^M/T = 2^4/13.4 = 1.19$.

The correction factor thus calculated is independent of the position of the "first 1." If the three digit group were shifted one bit to the left, the weighted value of the group would be multiplied by 2. Such left shifting would require the use of one additional active counter stage making a total of M+1 such stages. The new correction factor would be $2^{M+1}/2\Delta T$ which is exactly equal to $2^M/\Delta T$. By iteration, it is apparent that the correction factor is independent of the position of the "first 1."

For Example I, the computed feed rate clock pulses are supplied to first active module 76d of command pulse generator 51, and M=8 counter stages are active. The exact correction factor $2^M/\Delta T$, calculated using the full values of ΔX and ΔY, yields the value $2^M/\Delta T = [2^8/\sqrt{(100)^2+(200)^2}] = 256/224 = 1.15$. The approximate value 1.19 obtained using the three digit group is sufficiently accurate for machine tool operational requirements.

Table II below sets forth a list of all possible combinations of ΔX and ΔY three digit groups, together with the theoretical correction factor $2^M/\Delta T$ for each combination, wherein ΔT is calculated using the weighted values of the binary ones in the three digit groups. Table II also indicates that the theoretical correction factors can be approximated by an actual correction factor k/8, wherein k is an integer ranging between 6 and 15.

TABLE II

| ΔX 842 | ΔY 842 | Theoretical correction factor | Actual correction factor | | Percentage error |
|---|---|---|---|---|---|
| 100 | 000 | 2 | 15/8 | 1.875 | −6.25 |
| 100 | 001 | 1.94 | 15/8 | 1.875 | −3.3 |
| 100 | 010 | 1.78 | 14/8 | 1.75 | −1.7 |
| 100 | 011 | 1.6 | 13/8 | 1.625 | +1.5 |
| 101 | 000 | 1.6 | 13/8 | 1.625 | +1.5 |
| 101 | 001 | 1.54 | 12/8 | 1.5 | −2.6 |
| 101 | 010 | 1.48 | 12/8 | 1.5 | +1.35 |
| 100 | 100 | 1.41 | 11/8 | 1.375 | −2.5 |
| 101 | 011 | 1.37 | 11/8 | 1.375 | +.36 |
| 110 | 000 | 1.33 | 11/8 | 1.375 | +3.4 |
| 110 | 001 | 1.31 | 10/8 | 1.25 | −4.6 |
| 110 | 010 | 1.26 | 10/8 | 1.25 | −.8 |
| 101 | 100 | 1.25 | 10/8 | 1.25 | 0 |
| 110 | 011 | 1.19 | 10/8 | 1.25 | +5 |
| 111 | 000 | 1.14 | 9/8 | 1.125 | −1.3 |
| 111 | 001 | 1.13 | 9/8 | 1.125 | −.45 |
| 101 | 101 | 1.13 | 9/8 | 1.125 | −.45 |
| 110 | 100 | 1.11 | 9/8 | 1.125 | +1.35 |
| 111 | 010 | 1.10 | 9/8 | 1.125 | +2.3 |
| 111 | 011 | 1.05 | 8/8 | 1.00 | −4.75 |
| 110 | 101 | 1.025 | 8/8 | 1.00 | −2.4 |
| 111 | 100 | .99 | 8/8 | 1.00 | +1.0 |
| 110 | 110 | .94 | 8/8 | 1.00 | +6.4 |
| 111 | 101 | .93 | 7/8 | .875 | −5.9 |
| 111 | 110 | .87 | 7/8 | .875 | +.6 |
| 111 | 111 | .81 | 6/8 | .75 | −7.4 |

The percentage error between each of the tabulated theoretical correction factors and the corresponding fractional approximation also is listed in Table II. This error is considered well within the acceptable tolerance for speed control of machine tool 15. The reason for using such an actual correction factor approximated in eighths is to simplify implementation of path length compensator 63, as described below in conjunction with FIGS. 9 through 12.

Referring still to FIG. 9, path length compensator 63 comprises a four stage binary counter 190 which is advanced by feed rate clock pulses supplied on line 62 from programmed feed rate corrector 60 at a rate R' as discussed above. Counter 190 is arranged so as to advance repetitively through a count range from 0 to 15, then resets to zero and again cycle through the same count range.

A decrementing counter 191, which is included as a component of path length compensator 63, is preset to a count of 15 (that is, to binary 1111) by the clear signal on line 102. Counter 191 includes four binary stages 191a, 191b, 191c and 191d respectively having weighted values $2^0$, $2^1$, $2^2$ and $2^3$. As described below, counter 191 is decremented under control of counter and decode logic 192 so as to contain a count corresponding to the numerator k of the actual correction factor listed in Table II above.

Compensator 63 also includes a comparator 193 analogous to comparator 117 of FIG. 7. For each 16 pulses supplied to counter 190 on line 62, comparator 193 produces on line 167 a number of pulses equal to the contents k of decrementing counter 191. Thus, e.g., if decrementing counter 191 is set to k=9 (that is, to binary 1001), for each 16 pulses supplied on line 62, nine feed rate clock pulses will be supplied on line 167. Moreover, the k feed rate clock pulses produced on line 161 will be approximately uniformly spaced over the same time period as the 16 pulses supplied on line 62. In effect, compensator 64 has multiplied by k/16 the rate R'' of pulses provided on line 62 to produce on line 167 pulses at a rate R' = (k/16)R''.

Recall that k represents the numerator of the actual correction factor listed in Table II, the denominator being 8, or, alternatively expressed, $k/8 = 2^M/\Delta T$. Thus, path length compensator 64 accomplishes multiplication of the rate R'' of the pulses on line 62 by $\frac{1}{2}(k/8) = \frac{1}{2}(2^M/\Delta T)$. Accordingly, if $R'' = 16 V_t$, the feed rate clock pulses produced on line 167 will have the rate $R' = (k/16) R'' = \frac{1}{2}(2^M/\Delta T)16V_t = 8(2^M/\Delta T)V_t$, exactly as required by Equation (4) above.

Counter and Decode Logic of Path Length Compensator

Counter and decode logic 192 determines from the generated FRx and FRy command pulses the values of the ΔX and ΔY three digit groups and causes counter 191 to decrement to the corresponding value of k, as listed in Table II. To accomplish this, counter and decode logic 192 (FIGS. 9 and 10) includes a four stage binary counter 194 which includes stages 194a, 194b, 194c and 194d having the respective weighted values "1", "2", "4" and "8".

Initially counter 194 is preset to one (binary 0001) by the clear signal on line 102. Counter 194 then is advanced by count pulses received along a line 195 from a three input NAND gate 196. Gate 196 (FIG. 9) itself receives as inputs the inverted cycle complete signal on line 171, a lockup signal on a line 197 from a NAND gate 198 (FIG. 10), and a count pulse train obtained on a line 199 from the $2^3$ stage of binary counter 180.

Figure 10:
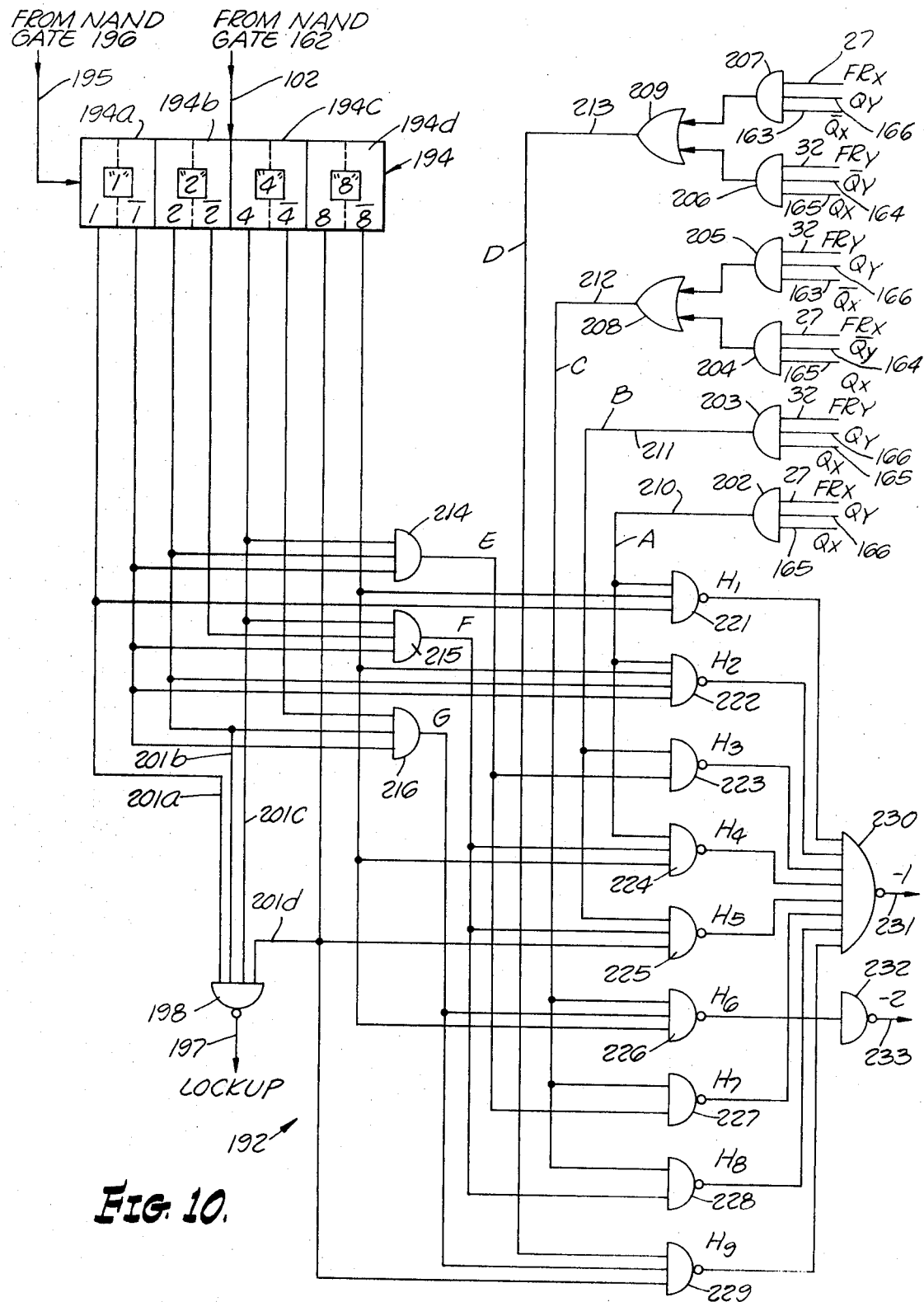
FIG. 10 is an electrical schematic diagram of the counter and decode logic components of the path length compensator shown in FIG. 9.

As shown in FIG. 10, four input NAND gate 198 receives as inputs four signals on lines 201a, 201b, 201c and 201d which are true when the respective counter stages 194a, 194b, 194c and 194d contain binary ones. Thus at least one input to NAND gate 198 is false, and hence the lockup signal on line 197 is true, until counter 194 reaches a count of 16 (i.e., binary 1111). At that time, the signals on all four of lines 201a–201d are true and the output of NAND gate 198 is false.

As noted earlier, the signal on line 171 (FIG. 9) is true throughout the counting cycle, becoming false upon occurrence of the cycle complete signal. Thus, prior to counter 194 (FIG. 10) reaching a count of 16, the inputs to NAND gate 196 on lines 171 and 197 are true, enabling NAND gate 196 to invert the count pulses on line 199 and supply these inverted count pulses to counter 194, via line 195.

The count pulses received on line 199 are at a rate which is one-eighth that at which pulses are supplied on line 167 (FIG. 9). As described above, this is exactly the rate at which the first command pulse enabling stage of counter 99 (FIG. 7) changes state. For example, if the first command pulse enabling counter stage were stage 99c, then for each 8 pulses supplied on line 167 to counter 180, 4 pulses would be supplied via lines 175 and 52 to counter stage 99a, and, as evident from waveforms 111 and 114 in FIG. 8, counter stage 99c would change state once. Accordingly, the count pulses on line 199 acting through gate 196 and line 195 cause counter 194 to step in unison with the first command pulse enabling stage of counter 99.

When counter 194 has completed a count of 16 pulses, all of the inputs to NAND gate 198 become true. This causes the lockup signal on line 197 to go false, inhibiting NAND gate 196 and causing counter 194 to lock up, i.e., to remain set at a count of 16. As will be described below, this causes decrementing counter 191 to remain set at the count $k$ to which it has been decremented.

Still referring to FIG. 10, decode logic 192 receives as inputs the $\overline{Qx}$, $\overline{Qy}$, $Qx$ and $Qy$ signals on lines 163–166 respectively, as supplied by flip-flops 160 and 161 described above in conjunction with compensator 64. In addition, decode logic 192 receives as inputs the FRx and FRy command pulses on lines 27 and 32 respectively. These inputs are combined by AND gates 202 through 207 and OR gates 208 and 209 to provide respective signals A, B, C, and D on lines 210, 211, 212 and 213. Occurrence of these four signals is defined by the following logic equations:

$$A = Qx \cdot Qy \cdot FRx \qquad (5)$$

$$B = Qx \cdot Qy \cdot FRy \qquad (6)$$

$$C = Qx \cdot \overline{Qy} \cdot FRx + \overline{Qx} \cdot Qy \cdot FRy \qquad (7)$$

$$D = \overline{Qx} \cdot Qy \cdot FRx + \overline{Qy} \cdot FRy \qquad (8)$$

As shown in FIG. 10, decode logic 192 also includes AND gates 214, 215 and 216 and NAND gates 221 through 229. These cooperate with signals A, B, C and D and with the contents of counters 194 to provide at the output of NAND gates 221 through 229 respective signals $H_1$ through $H_9$ defined by the logic equations in the following Table III.

TABLE III

| Signal | Logic Equation | Number of Occurrences | Weighted value of bit in three digit group enabling command pulse which gated this signal |
|---|---|---|---|
| $H_1$ | $= A \cdot 1 \cdot \overline{8}$ | 4 | 8 |
| $H_2$ | $= A \cdot \overline{1} \cdot 2 \cdot \overline{8}$ | 2 | 4 |
| $H_3$ | $= B \cdot \overline{1} \cdot 2 \cdot 4$ | 2 | 4 |
| $H_4$ | $= A \cdot \overline{1} \cdot \overline{2} \cdot 4 \cdot \overline{8}$ | 1 | 2 |
| $H_5$ | $= B \cdot \overline{1} \cdot \overline{2} \cdot 4 \cdot \overline{8}$ | 1 | 2 |
| $H_6$ | $= C \cdot \overline{1} \cdot \overline{2} \cdot 4 \cdot \overline{8}$ | 1* | 4 |
| $H_7$ | $= C \cdot \overline{1} \cdot 2 \cdot 4$ | 2 | 4 |
| $H_8$ | $= C \cdot \overline{1} \cdot 2 \cdot 4$ | 2 | 2 |
| $H_9$ | $= D \cdot \overline{1} \cdot 2 \cdot 4 \cdot \overline{8}$ | 1 | 4 |

The one occurrence of the $H_6$ signal, indicated by the asterisk (*) in Table III above, reduces the contents of counter 191 by 2.

In the logical equations of Table III, the values 1, 2, 4, 8 and $\overline{1}, \overline{2}, \overline{4}, \overline{8}$ respectively refer to the true and false states of respective counter stages 194a, 194b, 194c and 194d. For example, the $H_1$ signal will be produced at the output of NAND gate 221 when the signal A (defined by equation (5) above) is true, when the contents of counter stage 194a is true (i.e., when stage 194a contains a binary one), and when the contents of counter stage 194d is false (i.e., when stage 194d contains a binary zero).

The output of each of NAND gates 221–229 is true except upon occurrence of the logical conditions listed in Table III. That is, the signals $H_1$ through $H_9$ comprise false pulses.

The outputs of NAND gates 221–225 and 227–229 provide the eight inputs to a NAND gate 230, thus the output of NAND gate 230 on a line 231, is false except upon occurrence of one of the signals $H_1$ through $H_5$ and $H_7$ through $H_9$. Line 231 is connected to the $2^0$ stage 191a of decrementing counter 191 in such a manner that each true pulse from NAND gate 230 causes counter 191 to decrement by a count of 1.

The output of NAND gate 226 is inverted by a NAND gate 232 to provide on a line 233 a signal which is true whenever the logical conditions for signal $H_6$ occur. Line 233 is connected to the $2^1$ stage 191b of decrementing counter 191 in such a manner that each true pulse from NAND gate 232 causes counter 191 to decrement by a count of 2.

Figure 11:
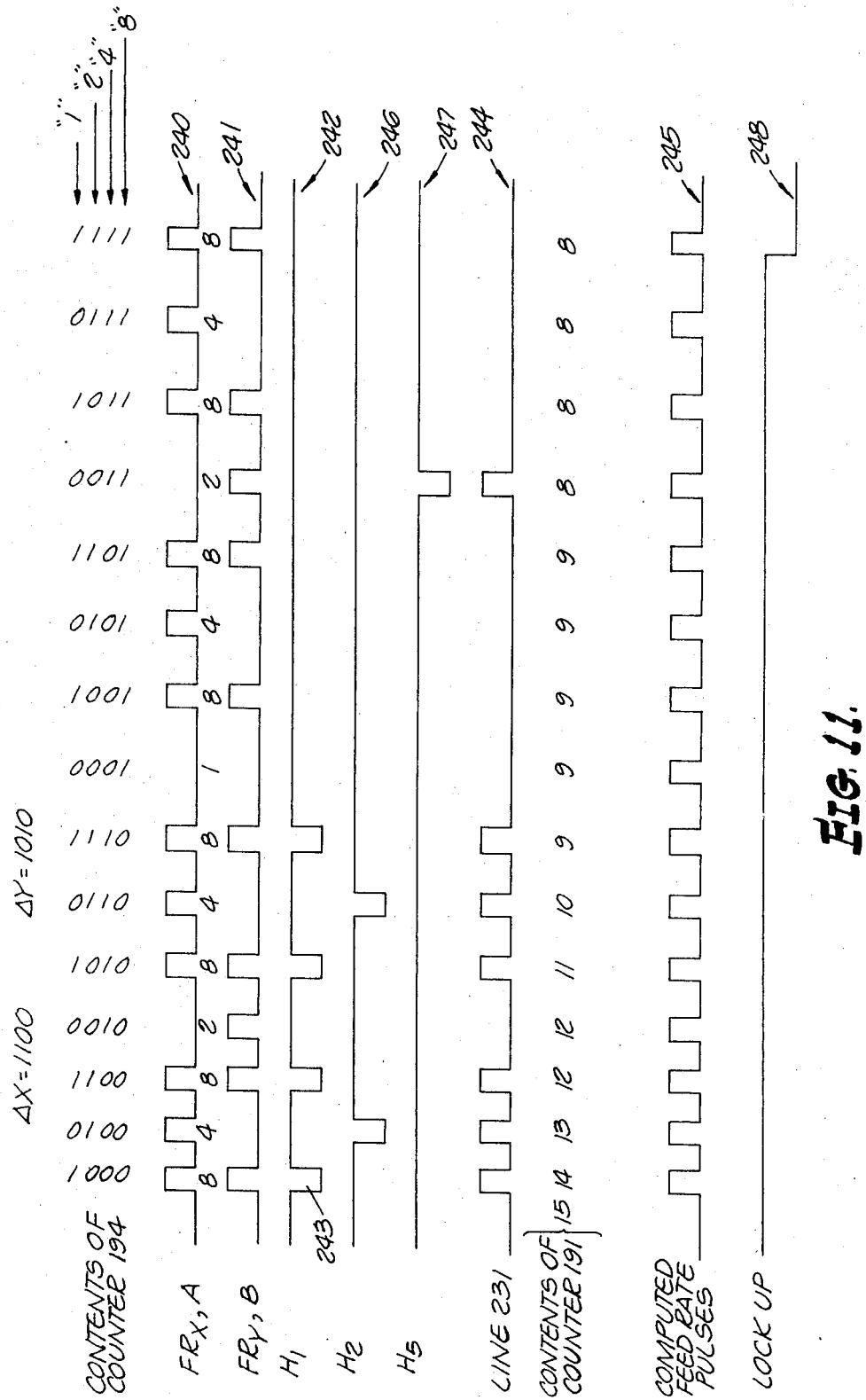
FIG. 11 is a set of waveforms illustrating operation of the path length compensator shown in FIGS. 9 and 10 for typical values of ΔX equal to binary 1100 and ΔY equal to binary 1010.
Figure 12:
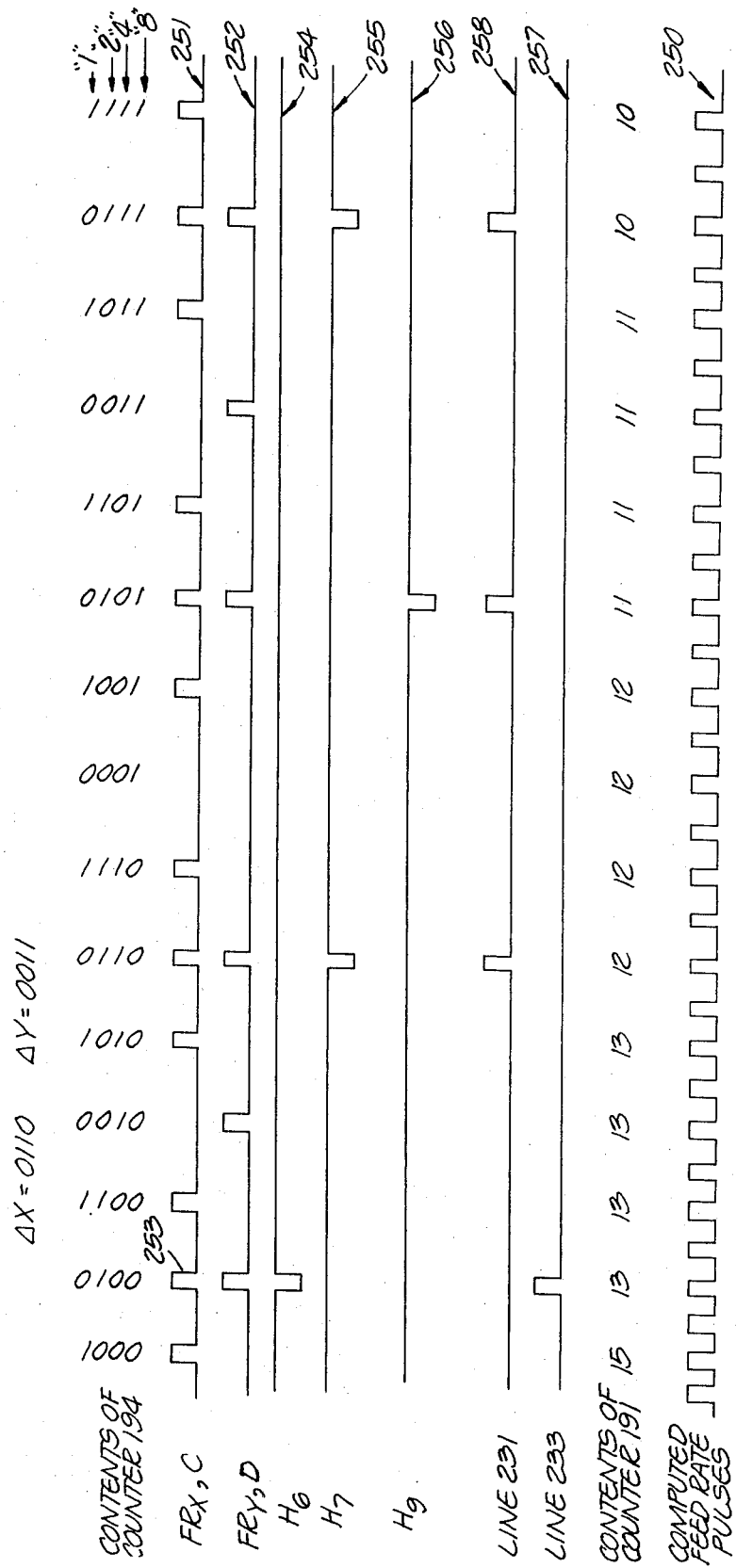
FIG. 12 is a set of waveforms illustrating operation of the path length compensator and the position of the "first 1" compensator shown in FIG. 9 for typical values of ΔX equal to binary 0110 and ΔY equal to binary 0011.

As will be apparent from the examples shown in FIGS. 11 and 12, various of the signals $H_1$ through $H_9$ occur more than once. The number of occurrences of each such signal $H_1$ through $H_9$ is listed in Table III. Moreover, each signal $H_1$ through $H_9$ is gated by occurrence of a command pulse on line FRx of FRy, which command pulse itself was enabled by a particular binary one in the three digit group of the $\Delta X$ and $\Delta Y$ data representing the cut being performed. Table III also lists the weighted value within the three digit group of the binary one so corresponding to each signal $H_1$ through $H_9$.

Operation of position of "first 1" compensator 63 and path length compensator 64 may be understood in conjunction with the following Example IV, waveforms corresponding to which are illustrated in FIG. 11.

tion of the cut being performed. Since all stages 194a through 194d of counter 194 then are set true (i.e., to binary one), none of signals $H_1$ through $H_9$ subsequently will be enabled. Thus subsequent to occurrence of the true to false transition of the lockup signal (waveform 248), the contents of counter 191 remains set at the value $k$ to which it had been decremented by counter and decode logic 192.

Recall that to obtain motion of machine tool 15 at a substantially constant speed $V_t$, pulses preferably are supplied on line 62 (FIG. 9) at a rate $R''$ numerically equal to $16V_t$. When the contents of decrementing counter 191 is equal to $k$, the numerator of the appropriate actual correction factor listed in TABLE II, this pulse rate $R''$ is multiplied by $k/16 = \frac{1}{2}(2^M/\Delta T)$ in compensator 63. Such multiplication provides pulses on line 167 at just the rate $R' = 8(2^M/\Delta T)V_t$ specified by equation (4) above for producing motion of machine tool 15 at speed $V_t$.

As was evident from the discussion of Example IV and FIG. 11, the contents of counter 191 generally is not set to the value $k$ as the first few FRx and/or FRy command pulses are generated. As a result, at the beginning of a cut cycle, command pulses generally will be produced at a rate greater than required to achieve machine tool motion at speed $V_t$. The command pulse rate then will decrease to the desired rate as counter 191 is decremented to $k$. Once the contents of counter 191 has reached the value $k$, which always occurs prior to lockup of counter 194, all subsequent command pulses are generated at the rate appropriate for achieving motion of machine tool 15 at speed $V_t$.

Referring again to FIG. 11 and Example IV, not until occurrence of the eighth FRy command pulse (see waveform 241) does counter 191 reach a count of $k=8$. Thus the first eight FRy command pulses and the first nine FRx command pulses (see waveform 240) occur at rates greater than that appropriate to achieve tool speed $V_t$. This is illustrated in FIG. 11 by the relatively closer spacing between successive computed feed rate clock pulses (waveform 245), and hence between successive FRx and FRy command pulses, prior to occurrence eighth FRy command pulse as compared with the spacing thereafter. Note also that the computed feed rate clock pulse spacing (waveform 245) increases as counter 191 is decremented by pulses on line 231 (waveform 244). The computed feed rate clock pulse spacing remains substantially constant subsequent to counter 191 reaching a count of $k$.

For all but the shortest of moves, the rate correction is introduced within only a short portion of the cut cycle. Thus, in Example IV, the rate correction is completed by the time the tenth FRx and ninth FRy command pulses (waveforms 240 and 241) are generated. The remainder of the 192 FRx command pulses and the 160 FRy command pulses are generated at a rate appropriate to achieve motion of machine tool 15 at speed $V_t$. Thus, introduction of the rate correction at the beginning of each cut cycle results in a brief feed rate transient which has a negligible effect on machine tool operation.

Note that path length compensator 63 functions to introduce the feed rate correction factor appropriate for particular values of $\Delta X$ and $\Delta Y$ without directly receiving these $\Delta X$ and $\Delta Y$ values as inputs. Rather, these values are deduced from the command pulses supplied to compensator 63. Decode logic 192 (FIGS. 9 and 10) is so arranged that command pulses enabled by particular sets of $\Delta X$ and $\Delta Y$ three digit groups will cause counter 191 to be decremented to the appropriate correction factor $k$.

This feature of operation of compensator 63 also is illustrated by FIG. 11 and Example IV. Here the three digit group in $\Delta X$ is 110, and the three digit group in $\Delta Y$ is 101. Note that signals A and B occur only when, as here, the three digit groups in both $\Delta X$ and $\Delta Y$ have binary ones in the weighted value "8" position (See TABLE I). Signal $H_2$ only occurs when, in addition, the $\Delta X$ three digit group contains a binary one in the weighted value "4" position. Similarly, signal $H_5$ only occurs when both $\Delta X$ and $\Delta Y$ three digit groups contain binary ones in the weighted value "8" position and, in addition, the $\Delta Y$ three digit group contains a binary one in the weighted value "2" position.

TABLE IV below lists all possible combinations of weighted values of $\Delta X$ and $\Delta Y$ three digit groups. For each such combination the table lists the corresponding value of the actual correct factor $k/8$, the number of counts by which counter 191 must be decremented so as to contain the value $k$, and the particular combination of signals $H_1$ through $H_9$ used to decrement counter 191.

TABLE IV

| Weighted values of three digit group | Actual correction factor | Number of counts counter 191 must be decremented | Signals used to decrement counter 191 |
|---|---|---|---|
| 8·8 | 11/8 | 4 | $H_1$ |
| 84·8 | 9/8 | 6 | $H_1$, $H_2$ |
| 84·84 | 8/8 | 7 | $H_1$, $H_2$, $H_3$* |
| 842·8 | 8/8 | 7 | $H_1$, $H_2$, $H_4$ |
| 842·84 | 7/8 | 8 | $H_1$, $H_2$, $H_3$, $H_4$* |
| 842·842 | 6/8 | 9 | $H_1$, $H_2$, $H_3$, $H_4$, $H_5$* |
| 82·8 | 10/8 | 5 | $H_1$, $H_4$ |
| 82·82 | 9/8 | 6 | $H_1$, $H_4$, $H_5$ |
| 84·82 | 8/8 | 7 | $H_1$, $H_2$, $H_5$ |
| 842·82 | 7/8 | 8 | $H_1$, $H_2$, $H_4$, $H_5$ |
| 8·0 or 8·2 | 15/8 | 0 | |
| 84·0 or 84·2 | 11/8 | 4 | $H_6$, $H_7$ |
| 842·0 or 842·2 | 9/8 | 6 | $H_6$, $H_7$, $H_8$ |
| 8·4 or 8·42 | 14/8 | 1 | $H_9$ |
| 84·4 or 84·42 | 10/8 | 5 | $H_6$, $H_7$, $H_9$ |
| 842·4 or 842·42 | 8/8 | 7 | $H_6$, $H_7$, $H_8$, $H_9$ |
| 82·0 or 82·2 | 13/8 | 2 | $H_8$ |
| 82·4 or 82·42 | 12/8 | 3 | $H_8$, $H_9$ |

NOTE.—For the items marked with an asterisk (*) in the above Table IV, one occurrence of $H_2$ coincides with one occurrence of $H_3$, so $H_2$ and $H_3$ together decrement counter 191 by 3.

TABLE IV may be related to FIG. 11 by noting that the weighted values of the three digit group for $\Delta X$ and $\Delta Y$ of Example IV are 84·82. From TABLE IV, this requires counter 191 to be decremented by 7, which is accomplished using signals $H_1$, $H_2$ and $H_5$. These are exactly the signals shown in FIG. 11, which signals produce seven pulses (waveform 244) on line 231 to decrement counter 191 by 7.

Various other operational features of position of "first 1" compensator 64 and path length compensator 63 are illustrated by the waveforms of FIG. 12, wherein $\Delta X$ and $\Delta Y$ have the values given by Example III above. In this example, note that module 76d is the first active module of command pulse generator 51. The "first 1" has significance $2^6$, and hence is stored in the $\Delta X$ storage position 77r of first active module 76d. Accordingly, the first command pulse enabling counter stage is stage 99b in first active module 76d. The three

EXAMPLE IV

```
                         "first 1"
ΔX=0000 0000 0000 | 110 | 0  0000=192 FRx pulses=.0192 inches
ΔY=0000 0000 0000 | 101 | 0  0000=160 FRy pulses=.0160 inches
                  └─────┘
                   Three
                   digit
                   group
```

For this example, module 76d of command pulse generator 51 (FIG. 6) is the first active module, and modules 76a, 76b and 76c all are inactive. Note that in FIG. 7, ΔX storage positions 77r and 77s in module 76d will contain binary ones while storage positions 77p and 77q contain binary zeros, and that ΔY storage positions 78q and 78s in module 76d also will contain binary ones, while storage positions 78p and 78r contain binary zeros.

Initially, decrementing counter 191 is preset to 15 (i.e., to binary 1111), so that occurrence of the first pulse on line 62 (FIG. 9) causes a feed rate pulse to be produced on line 167 by comparator 193. This pulse is fed via gates 168 and 176 to counter 178, causing counter stage 178a to go true. The same pulse is fed via gates 168 and 174 and line 52 to counter stage 99a in first active module 76d. Since a binary one is contained in both ΔX storage position 77s and ΔY storage position 78s, this first computed feed rate clock pulse supplied on line 52 to counter 99 in module 76d will result in simultaneous generation of an FRx command pulse on line 27 and an FRy command pulse on line 32.

The simultaneous initial FRx and FRy command pulses, gated by the first feed rate clock pulse supplied on line 52, will set both of flip-flops 160 and 161 (FIG. 9) to the Q state. The $\overline{Qx}$ and $\overline{Qy}$ signals on respective lines 163 and 164 will go false, thereby inhibiting NAND gate 168 and causing counter 178 to remain set at "1", i.e., with stage 178a true and stages 178b, 178c and 178d each false. Thus the contents of counter 178 indicates that counter stage 99a (in first active module 76d) is the first command pulse enabling counter stage in command pulse generator 51.

Since both of flip-flops 160 and 161 are set true, both of signals Qx and Qy on respective lines 165 and 166 are true, thereby enabling AND gates 202 and 203 in counter and decode logic 192 (FIG. 10). Accordingly, the signals A and B on lines 210 and 211 respectively will correspond exactly to the FRx and FRy signals on command pulse lines 27 and 32. These A and B signals are illustrated by typical waveforms 240 and 241 in FIG. 11, for the values of ΔX and ΔY given in Example IV. Since $\overline{Qx}$ and $\overline{Qy}$ both are false, the signals C and D on lines 212 and 213 also will be false.

The binary contents of counter 194 are indicated at the top of FIG. 11. Upon occurrence of the simultaneous initial FRx and FRy command pulses, counter 194 will be set to binary 0001. The logical conditions (see TABLE III) for occurrence of the $H_1$ signal are met, since signal A is true, the "1" stage 194a of counter 194 contains a binary one, and the "8" stage 194d of counter 194 contains a binary zero. Resultantly, as shown in waveform 242 in FIG. 11, a false $H_1$ pulse 243 occurs at the output of NAND gate 221. This $H_1$ pulse 243 is inverted by NAND gate 231, all other inputs to which are true, to provide a pulse (see waveform 244 of FIG. 11) on line 231 which decrements counter 191 by 1. As indicated near the bottom of FIG. 11, the contents of decrementing counter 191 initially was 15 (i.e., binary 1111); occurrence of the first $H_1$ pulse 243 decrements counter 191 to a count of 14.

Occurrence of the next eight pulses on line 62 (FIG. 9) results in production of eight feed rate clock pulses on line 167 (since counter stages 191b, 191c and 191d all still contain binary ones). These pulses operate counter 180, which is no longer inhibited since $\overline{Qx}$ and $\overline{Qy}$ both are false. Since counter 178 is set to "1", a signal computed feed rate clock pulse is produced by comparator unit 183 for each eight pulses supplied on line 167. This is the second computed feed rate clock pulse shown in waveform 245 in FIG. 11, and is supplied to counter stage 99a in module 76d via lines 175 and 52, to cause generation of the second FRx command pulse. As indicated by the numerals just below waveform 240 in FIG. 11, this second FRx command pulse is enabled by the binary one stored in weighted value "4" storage position 77r (FIG. 7) of ΔX storage unit 77 in module 76d.

The initial eight feed rate clock pulses on line 167 (FIG. 9) fed to counter 180 result in a single pulse being supplied on line 199. This pulse is inverted by NAND gate 196 and provided via line 195 to advance counter 194 (FIG. 10) to a count of 2 (i.e., to binary 0010). Notice that counter 194 thus is advanced in unison with the first command pulse enabling counter stage 99a in first active module 76d.

Referring to TABLE III and to FIG. 11, occurrence of the second FRx pulse with counter 194 set to a count of 2 enables production of an $H_2$ pulse, as shown in waveform 246. This $H_2$ pulse is inverted by NAND gate 230 to provide the second pulse on line 231, as indicated by waveform 244. This second pulse on line 231 decrements counter 191 by a count of one, thereby reducing the contents of counter 191 to 13 (i.e., to binary 1101).

This operation continues, with every eighth pulse supplied on line 167 resulting in a single computed feed rate clock pulse being produced on line 52 and causing a single count pulse on line 195 to increment counter 194. At times designated by the logic equations in TABLE III, additional $H_1$ and $H_2$ pulses will be produced, as indicated in FIG. 11, causing further decrementing of counter 191.

When counter 194 reaches a count of 12 (i.e., binary 1100), in unison with occurrence of the twelfth computed feed rate pulse on line 52, a single $H_5$ pulse will be produced at the output of NAND gate 225. This false $H_5$ pulse, illustrated by waveform 247 in FIG. 11, is inverted by NAND gate 230 to provide the pulse on line 231 (see waveform 244 in FIG. 11) which finally decrements counter 191 to a count of 8 (i.e., binary 1000). Note that counter 191 now contains the value $k=8$ corresponding to the numerator of the actual correction factor listed in TABLE II for the three digit group (110 and 101) corresponding to the ΔX and ΔY values of Example IV.

Counter 194 continues to be incremented until a count of 15 is reached therein. As indicated by waveform 248 in FIG. 11, the lockup signal on line 197 then goes from true to false, disabling NAND gate 196 and preventing further count pulses from reaching counter 194. Counter 194 thus remains set at 15 (i.e., binary 1111) for the remainder of the cut cycle, until being reset by the clear signal on line 102 upon compledigit group has weighted values (as given by TABLE I) of 8,4 in $\Delta X$ and 4,2 in $\Delta Y$.

Since counter stage $99b$ is the first command pulse enabling stage, upon occurrence of the initial command pulse, stage $178b$ (FIG. 9) of counter 178 in each compensator 64 will be set true. Accordingly, for each eight pulses supplied on line 167, two computed feed rate clock pulses will be provided on line 52 to first active module $76d$. These two pulses will cause stage $99b$ in module $76d$ to change stage once. Since one count pulse to counter 194 is provided via lines 199 and 195 for each eight pulses supplied to counter 180 on line 167, counter 194 will advance (i.e., change state) in unison with the first command pulse enabling stage $99b$ of first active module $76d$. Thus in FIG. 12, note that the contents of counter 194 increments by 1 each time two computed feed rate pulses (see waveform 250) are supplied on line 52.

In FIG. 9, the initial command pulse will occur on FR$x$ line 27 and will be enabled by the "first 1", which has a weighted value "8" as given by TABLE I. No command pulse will occur simultaneously on FR$y$ line 32, so that flip-flop 160 will be set to the Q state, flip-flop 161 will remain set at $\overline{Q}$. As a result, the FR$x$ pulses will be gated via AND gate 204 (FIG. 10) and OR gate 208 onto line 212, as shown by waveform 251 (signal C) in FIG. 12. Similarly, the FR$y$ pulses will be gated via AND gate 206 and OR gate 209 onto line 213, as shown by waveform 252 (signal D) in FIG. 12.

As noted for Example II, counter 194 advances once for each two computed feed rate clock pulses. Thus the contents of counter 194 (FIG. 10) bears the same relationship to the weighted value in the three digit group of the binary one enabling each command pulse as described in conjunction with FIG. 11 above. For example, the second FR$x$ command pulse 253 (FIG. 12) is enabled by the binary one having significance "4" in the $\Delta X$ three digit group. When this pulse 253 occurs, the contents of counter 194 is 2 (i.e., binary 0010). As a result, the correct machine tool speed will be obtained using the signals specified in TABLE IV to decrement counter 191, even though the "first 1" has a position different from that of Example IV.

Referring to FIG. 12 and to TABLE IV, for Example III counter 191 is decremented by signals $H_6$, $H_7$ and $H_9$, illustrated respectively by waveforms 254, 255 and 256. Signal $H_6$ comprises a single pulse which is inverted by NAND gate 232 (FIG. 10) to provide a signal on line 233, illustrated by waveform 257, which causes counter 191 to decrement by 2. The two $H_7$ pulses and the one $H_9$ pulse are gated onto line 231 via NAND gate 230, to provide the signal represented by waveform 258. Each of the three pulses on line 231 decrements counter 191 by 1. Thus, as indicated near the bottom of FIG. 12, counter 191 is decremented by the signals on lines 231 and 233 so as to contain the value $k$=10, corresponding to the desired actual correction factor given in TABLE II above.

Programmed Feed Rate Corrector

Figure 13:
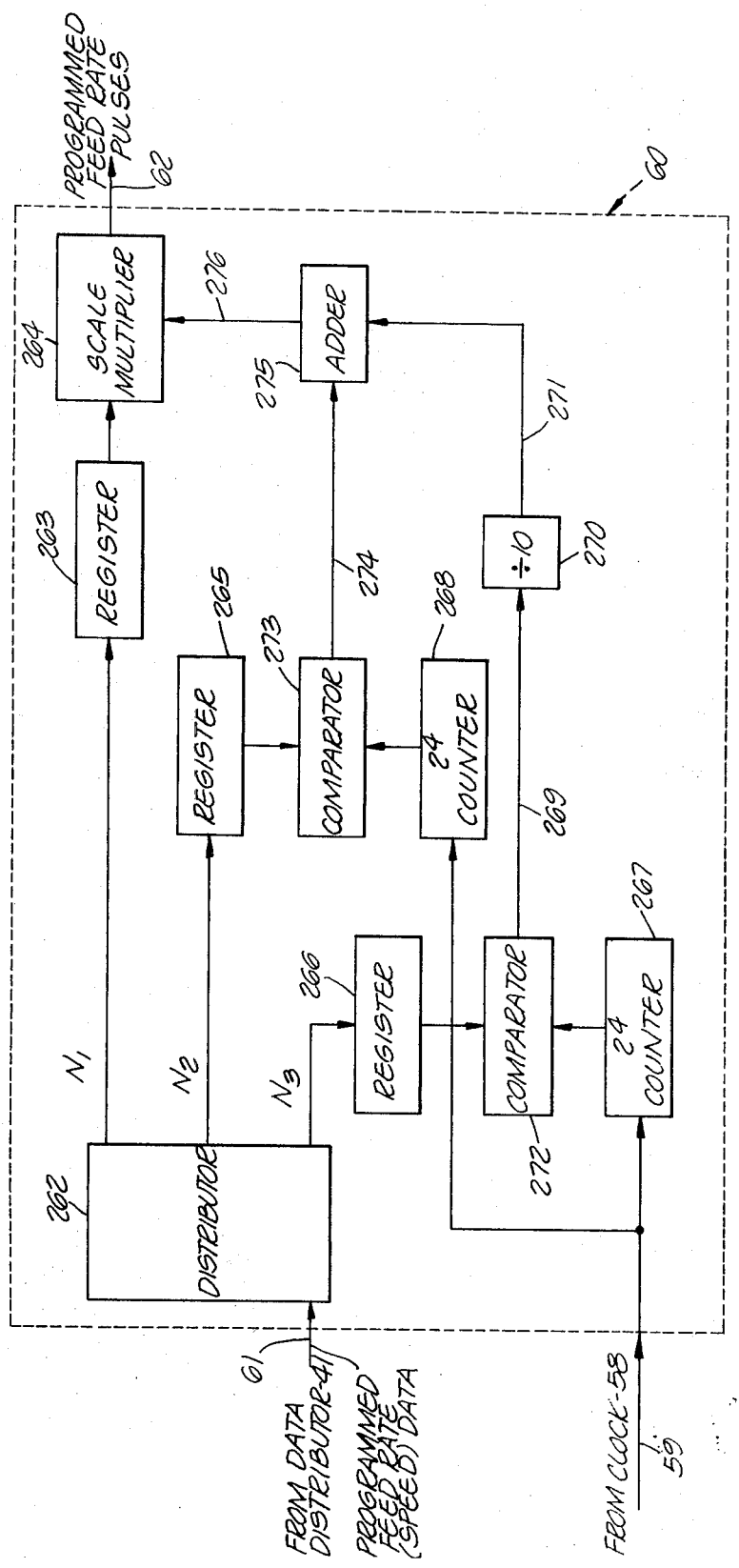
FIG. 13 is an electrical block diagram of the programmed feed rate corrector portion of the contour control computer shown in FIG. 6.

With reference to FIG. 1(a), the circuitry used to provide pulses on line 62 to the path length compensator 63 at a rate $R''$ numerically equal to 16$V_t$ is the Programmed Feed Rate Corrector 60 (FIG. 13). In FIG. 13, the programmed feed rate corrector 60 is fed by a feed rate clock 58 having a manual override control 65.

Feed rate clock 58 is typically a voltage controlled oscillator. The feed rate corrector 60 receives on line 61 programmed feed rate data from tape reader 40 or other data inputs 44 via data distributor 41.

Preferably, programmed feed rate data is supplied to corrector 60 in the format specified by the Electronic Industries Association (EIA) Standard RD–274–A. In this format, the speed $V_t$ is expressed as a three decimal digit coded number on line 61. The second and third digits $N_2$ and $N_3$ of the coded number represent the speed, rounded to two decimal digit accuracy. The first digit $N_1$ of the coded number is a decimal multiplier and has a value 3 greater than the number of digits to the left of the decimal point of the speed. If there are no digits of the speed to the left of the decimal point, then the number of zeros immediately to the right of the decimal point is subtracted from 3 to provide the value of the first digit. The above format is called the "magic 3" coding and is illustrated by the examples in TABLE V below.

TABLE V

| Speed | Coding |
|---|---|
| 100.0 | 610 |
| 15.2 | 515 |
| 7.82 | 478 |
| 0.153 | 315 |
| 0.0126 | 213 |
| 0.00875 | 188 |
| 0.000462 | 046 |

Referring to FIG. 13, the programmed feed rate data, received in "magic 3" format via line 61, is supplied to a conventional distributor 262. Distributor 262 directs the "magic 3" digit $N_1$ via line 279 to a register 263. As noted, digit $N_1$ comprises a decimal multiplier, and is used in programmed feed rate corrector 60 to control operation of a scale multiplier 264. Distributor 262 also provides the second and third "magic 3" digits $N_2$ and $N_3$, converted into binary form, to respective four stage binary registers 265 and 266.

Feed rate clock 58 (FIG. 1(a)) provides clock pulses on line 59, input to programmed feed rate corrector 60, at a rate related to the maximum programmable speed permitted for machine tool 15 (FIG. 1(a)). These clock pulses are supplied on line 59 to a pair of four-stage binary counters 267 and 268. Each of counters 267 and 268 is similar to counter 190 (FIG. 9), and cycle repetitively through a count range of from 0 to 15 in response to the received clock pulses on line 59.

A comparator 272 (FIG. 13), analogous in operation to comparator logic 117 of FIG. 7, compares the contents of counter 267 with the contents of register 266 and produces a number of pulses equal to $N_3$ on a line 269 for each 16 clock pulses supplied on line 59. The pulses on line 269 are directed to a conventional divide by 10 unit 270 which produces one output pulse on a line 271 for each 10 input pulses received on line 269. Thus the pulse rate on line 271 will be one-tenth that of the pulse rate on line 269. This factor of one-tenth compensates for the decimal order of magnitude lesser significance of the $N_3$ digit of the "magic 3" data as compared with the $N_2$ digit.

Another comparator 273, analogous to comparator 272, compares the contents of binary counter 268 with the contents of register 265 and produces a number of pulses equal to $N_2$ on a line 274 for each 16 pulses provided on line 59. The pulses on lines 271 and 274 are combined by an adder unit 275. The output of adder 275, on a line 276, comprises a train of pulses which, during a given period of time, equal in number the sum of the number of pulses supplied on lines 271 and 274 during the like time period.

Scale multiplier 264 multiplies the pulse rate on line 276 by an amount determined by the value of "magic 3" decimal multiplier digit $N_1$. For example, scale multiplier 264 may comprise a circuit which multiplies the rate by $10^{-(N_m-N_1)}$ where $N_m$ represents the maximum permitted value of $N_3$.

The rate of which clock pulses are provided by feed rate clock 58 is related to the maximum speed capable of being handled by the machine tool system. For example, the maximum programmable speed may be 100 inches per minute, the "magic 3" coding for which is the decimal number 610 (see TABLE V).

As discussed above, the rate $R''$ at which pulses are to be supplied on line 62 is numerically equal to $16V_t$, where $V_t$ is given in incremental distance units per unit of time. An incremental distance unit corresponds to the distance machine tool 15 is moved along the X- or Y-axis for each FRx or FRy command pulse received by respective drive means 30 or 31 (FIG. 1). For example, if machine tool 15 is moved 0.0001 inch for each command pulse, $V_t$ should be in units of $10^{-4}$ inches per unit of time. Thus, if the maximum programmable speed is 100 inches per minute, this corresponds to a value $V_t = 10^6$ distance units per minute. Correspondingly, the rate $R''$ at which pulses should be supplied on line 62 to obtain motion of machine tool 15 at a speed $V_t$ of 100 inches per minute is given by $R'' = 16 \times 10^6$ pulses per minute.

Assuming the maximum permissible machine tool speed to be 100 inches per minute, corresponding to a "magic 3" coded number 610, the maximum value $N_m$ of digit $N_1$ is 6. If this maximum speed is programmed, register 263 (FIG. 13) will store the number $N_1 = 6$, and scale multiplier 264 accordingly will multiply the pulse rate on line 276 by $10^{-(N_m-N_1)} = 10^{-(6-6)} = 10^0 = 1$. That is, the pulses produced on line 62 will be at the same rate as the pulses present on line 276.

The contents of register 265 for the coded number 610 will be (i.e., binary 0001), and comparator 273 will provide an output on line 274 of one pulse for each 16 clock pulses received on line 59. The contents of register 266 will be 0 (i.e., binary 0000) and no pulses will be provided from comparator 268 on line 269. Accordingly, the output of adder 275, on line 276, will comprise one pulse for each 16 pulses supplied on line 59.

Since scale multiplier 264 introduces a factor of unity, the pulse rate on line 62 will be one-sixteenth of the rate at which clock pulses are produced by feed rate clock 58. The desired pulse rate $R''$ on line 62 is $16V_t = 16 \times 10^6$ pulses per minute. Thus, feed rate clock 58 should provide pulses on line 59 at a rate of $16 \times 16 \times 10^6$ pulses per minute. This is equivalent to a feed rate clock frequency of 4.27 MHz. Feed rate clock 58 is operated at this frequency regardless of what feed rate is actually programmed, unless altered by use of manual feed rate override control 65. Of course, this feed rate clock frequency is related to the assumed maximum speed of 100 inches per minute; for systems using other maximum speed values, the feed rate clock frequency would be different.

To further illustrate operation of feed rate corrector 60, assume that the programmed speed for machine tool 15 is 0.75 inch per minute, as designated by the "magic 3" coded number 375. Registers 263, 265 and 266 respectively will contain the binary equivalents of the decimal numbers 3, 7 and 5. Accordingly, for each 160 pulses from feed rate clock 58, 30 pulses will be provided by comparator 273 on line 274, and 50 pulses will be provided by comparator 272 on line 269. The pulse train on line 269 is divided by 10 in unit 270 to provide five pulses on line 271 for each 160 pulses supplied to counter 267 on line 59. Accordingly, adder 275 will provide 75 pulses on line 276 for each 160 pulses generated by feed rate clock 58.

With feed rate clock 58 operating at a frequency of 4.27 MHz, the pulse rate on line 276 will be $(75/160) \times 4.27 \times 10^6$ pulses per second = $2 \times 10^6$ pulses per second = $1.2 \times 10^8$ pulses per minute. Since $N_1$ has a value of 3, scale multiplier 264 will multiply the pulse rate on line 276 by $10^{-(6-3)} = 10^{-3}$, and hence will provide pulses on line 62 at a rate $R'' = (1.2 \times 10^8) \times 10^{-3}$ pulses per minute = $1.2 \times 10^5$ pulses per minute. The programmed machine tool speed of 0.75 inch per minute corresponds to $V_t = 7,500$ distance units per minute. Thus the desired rate $R''$ for pulses on line 62 is $16V_t = 16 \times 7500$ pulses per minute = $1.2 \times 10^5$ pulses per minute, exactly as provided by programmed feed rate corrector 60.

Recall that for the values of $\Delta X$ and $\Delta Y$ given by Example IV above, decrementing counter 191 in path length compensator 63 (FIG. 9) will be set to a count of $k=8$, corresponding to the actual correction factor 8/8 given by TABLE II for the three digit group 110 (in $\Delta X$) and 101 (in $\Delta Y$). Thus, for each 16 pulses provided on line 62, eight pulses will be provided on line 167 by path length compensator 63. For a programmed machine tool speed of 0.75 inch per minute, the pulse rate on line 62 will be $R'' = 1.2 \times 10^5$ pulses per minute, hence the pulse rate on line 167 will be $R' = (8/16) R'' = (8/16) \times 1.2 \times 10^5 = 6 \times 10^4$ pulses per minute.

Still referring to Example IV, the first command pulse enabling counter stage is stage 99a in module 76d (FIG. 6) of command pulse generator 51. Accordingly, stage 178a of counter 178 (FIG. 9) in position of "first 1" compensator 64 will be set true, and compensator 64 will supply one computed feed rate clock pulse on line 52 for each eight pulses supplied on line 167. Thus, since the pulse rate on line 167 is $R' = 6 \times 10^4$ pulses per minute, computed feed rate clock pulses will occur on line 52 at the rate of $\frac{1}{8} \times 6 \times 10^4 = 7.5 \times 10^3$ pulses per minute.

For Example IV, the two modules 76d and 76e (FIG. 6) are active, comprising a total of $M=8$ counter stages. Thus a total of $2^M = 2^8 = 256$ computed feed rate clock pulses are required to complete the cut cycle. If supplied at a rate of $7.5 \times 10^3$ pulses per minute, the cut cycle will be completed in approximately $256/7.5 \times 10^3 = 3.4 \times 10^{-2}$ minutes. In this time, 192 FRx command pulses and 160 FRy command pulses will be generated, and machine tool 15 will move a distance $\Delta T = \sqrt{(.0192^2 + (.0160)^2} = 2.5 \times 10^{-2}$ inches. Thus Machine tool 15 will move at a rate of approximately ($2.5 \times 10^{-2}$ inches/$3.4\times10^{-2}$ minutes)=0.735 inch per minute. The discrepancy of about 2 percent between the actual speed of 0.735 inch per minute and the programmed speed of 0.75 inch per minute is introduced by approximating the theoretical correction factor $2^M/\Delta T = 1.025$ by 8/8 as discussed above in conjunction with TABLE II.

Although programmed feed rate corrector 60 has been illustrated in FIG. 13 as including two comparators 272 and 273, and receiving data in the "magic 3" coded format, the invention is not so limited. Thus if the programmed feed rate data is provided in other coding formats wherein the speed is specified to more than two decimal digit accuracy, similar corrector circuitry may be used. Generally, one four binary digit counter, comparator and register will be employed for each decimal digit specifying the desired speed. The pulse outputs of the comparators then will be divided by appropriate multiples of ten before being combined by the equivalent of adder 275 (FIG. 13).

Thus, there has been described a machine tool contour control system capable of driving a machine tool along a straight line path, defined by cut length components parallel to non-coincident axes, at a preselected speed which remains substantially constant regardless of the length of the straight line path.

While the invention has been particularly shown and described with reference to preferred embodiments thereof, it will be understood by those skilled in the art that the foregoing and other changes in form and details may be made therein without departing from the spirit and scope of the invention.

What is claimed is:

1. A machine tool control system for commanding component movements along first and second orthogonal axes to cause machine tool movement at a resultant rate, for a resultant distance and in a resultant direction, including a first digital means having a count contained in a plurality of active bits for specifying the component of movement along said first axis, second digital means having a count contained in a plurality of active bits for specifying the component of movement along said second axis, and third means generating a programmed signal at a first rate and including generator means operated by a control signal and in response to said first digital means for generating a number of command pulses representing the distance to be traveled along said first axis and in response to said second digital means for generating a number of command pulses representing the distance to be traveled along said second axis, the improvement comprising, control means for generating said control signal so as to cause said generator means to generate command pulses at a rate altered by a correction factor so as to render said resultant rate substantially a constant independent of the counts in said first and second digital means, said correction factor being related to the length of a straight line path to be followed by the tool, said control means including compensator means responsive to said command pulses and to at least some of said active bits for generating said correction factor.

2. A machine tool control system for commanding component movements along first and second orthogonal axes to cause machine tool movement at a resultant rate, for a resultant distance and in a resultant direction, including a first digital means having a count contained in a plurality of active bits for specifying the component of movement along said first axis, second digital means having a count contained in a plurality of active bits for specifying the component of movement along said second axis, and third means generating a programmed signal at a first rate and including generator means operated by a control signal and in response to said first digital means for generating a number of command pulses representing the distance to be traveled along said first axis and in response to said second digital means for generating a number of command pulses representing the distance to be traveled along said second axis, the improvement comprising, control means for generating said control signal so as to cause said generator means to generate command pulses at a rate altered by a correction factor so as to render said resultant rate substantially a constant independent of the counts in said first and second digital means, said control means including compensator means responsive to said command pulses and to at least some of said active bits for generating said correction factor, wherein said compensator means includes, a first binary counter having N bits and operative to be stepped by said programmed signal, a second counter having N bits for storing a binary number K, a comparator connected to said first and second counters for generating an output, to form said control signal, each time the count in said first counter equals the value K stored in said second counter whereby said correction factor is proportional to K/N and said control signal has a rate K/N times said first rate.

3. The control system of claim 2 wherein said compensator means further includes, a decoder responsive to groups of high order active bits from each of said first and second digital means to produce a decoded value of K approximately equal to the square-root of the sum of the squares of the weighted values of said groups, and means for loading the decoded value of K into said second counter.

4. The control system of claim 3 wherein said first and said second digital means are organized in blocks of a plurality of ordered bits and wherein the size of said groups is at least three bits, said compensator means further including, a "first 1" compensator for detecting the location of the highest order 1 within a block and means for multiplying said control signal by a factor $(\frac{1}{2})^i$ where "$i$" is a number designating the location of the highest order 1 within the block.

5. A machine tool contour control system for directing a tool at a preselected substantially constant speed along a resultant path defined by distance components parallel to orthogonal axes, said system comprising:

a source of clock pulses, a first binary counter of M stages advanced by pulses from said source, a first register having M storage positions and adapted to store a first binary representation of a distance component parallel to a first of said orthogonal axes, a second register having M storage positions and adapted to store a binary representation of a distance component parallel to a second of said orthogonal axes, first comparator means cooperating with said first binary counter and with said first and second registers for producing first and second trains of command pulses, said first train having a number of pulses equal to the value of said first binary representation, said second train having a number of pulses equal to the value of said second binary representation, the pulses of said first and second trains being approximately uniformly spaced over the same period of time, first drive means operative to move said tool through a unit of distance parallel to said first axis in response to a command pulse of said first train, second drive means operative to move said tool through a unit of distance parallel to said first axis in response to a command pulse of said second train, and compensator means for determining from said command pulses the approximate values of said first and second binary representations and for modifying the rate of said clock pulses in response to said determined approximate values so that the resultant command pulses will occur at a rate causing tool motion at said preselected speed regardless of the length or slope of said resultant path, said compensator means for modifying the rate of said clock pulses including means for modifying said clock pulses in accordance with a correction factor related to the length of the straight line path to be followed by the tool.

6. A machine tool contour control system for directing a tool at a preselected substantially constant speed along a resultant path defined by distance components parallel to orthogonal axes, said system comprising:

a source of clock pulses, a first binary counter of M stages advanced by pulses from said source, a first register having M storage positions and adapted to store a first binary representation of a distance component parallel to a first of said orthogonal axes, a second register having M storage positions and adapted to store a binary representation of a distance components parallel to a second of said orthogonal axes, first comparator means cooperating with said first binary counter and with said first and second registers for producing first and second trains of command pulses, said first train having a number of pulses equal to the value of said first binary representation, said second train having a number of pulses equal to the value of said second binary representation, the pulses of said first and second trains being approximately uniformly spaced over the same period of time, first drive means operative to move said tool through a unit of distance parallel to said first axis in response to a command pulse of said first train, second drive means operative to move said tool through a unit of distance parallel to said second axis in response to a command pulse of said second train, and compensator means for determining from said command pulses the approximate values of said first and second binary representations and for modifying the rate of said clock pulses in response to said determined approximate values so that the resultant command pulses will occur at a rate causing tool motion at said preselected speed regardless of the length or slope of said resultant path, wherein said comparator means comprises:

means for providing a command pulse of said first train whenever the $i^{th}$ stage of said first binary counter is false and all preceding stages of lesser significance are true and when the $i^{th}$ bit, as counted from the first register storage position of most significance, of said first binary representation is true, and means for providing a command pulse of said second train whenever the $i^{th}$ stage of said first binary counter is false and all preceding stages of lesser significance are true and when the $i^{th}$ bit, as counted from the second register storage position of most significance, of said second binary representation is true, and wherein $i$ is an integer between 1 and M.

7. A contour control system according to claim 6 wherein command pulses of said first and second trains are gated by said clock pulses.

8. A contour control system according to claim 6 wherein said compensator means comprises:

first means for ascertaining the position $j$ of the most significant "1" bit in the largest of said first and second binary representations, $j$ being an integer between 1 and M, said position $j$ being counted from the storage position of most significance in the register storing said largest representation, and second means for modifying said clock pulse rate in response to the contents of the $j$, $j+1$ and $j+2$ storage positions of said first and second registers, said contents being determined from said command pulses.

9. A contour control system according to claim 8 wherein said first means comprises:

a second binary counter advanced by said clock pulses, and inhibit means for stopping said second binary counter upon occurrence of the initial command pulse from said comparator means.

10. A contour control system according to claim 8 wherein said second means comprises:

storage means for storing the $j^{th}$ bit of said first binary representation and the $j^{th}$ bit of said second binary representation, said $j^{th}$ bits being determined from said command pulses.

11. A contour control system according to claim 10 wherein said storage means comprises first and second flip-flops, said first flip-flop being set if the initial command pulse from said comparator means is in said first train, said second flip-flop being set if said initial command pulse is in said second train, both of said flip-flops being set if initial command pulses occur simultaneously in both said first and second trains.

12. A contour control system according to claim 10 wherein said second means further comprises:

a third binary counter advanced at the same rate as the $j^{th}$ stage of said first binary counter, decode means, responsive to the contents of said storage means, to said command pulses and to the contents of said third binary counter, for providing control signals for reducing the rate of said clock pulses.

13. A contour control system according to claim 12 wherein said second means further comprises:
a fourth binary counter of K stages repetitively cycled in response to clock pulses from said source,
a decrementing counter having contents established by said control signals, and
second comparator means cooperating with said fourth binary counter and said decrementing counter for providing an output of $k$ pulses for each $2^k$ clock pulses received by said fourth binary counter, where $k$ corresponds to the contents of said decrementing counter.

14. A contour control system according to claim 13 wherein K=4, wherein $k$ is approximately equal to 16 divided by the length of said resultant path, wherein binary "1" bits in the J, $j+1$ and $j+2$ bit positions of said first or second binary representations respectively are assigned the weighted values 8, 4 and 2, and wherein the length of said resultant path is approximated by summing the weighted values of said $j$, $j+1$ and $j+2$ bits of said first binary representation, summing the weighted values of said $j$, $j+1$ and $j+2$ bits of said secondary binary representation, and determining the square root of the sum of the squares of said summed weighted values.

15. A contour control system according to claim 14 wherein said compensator means further comprises:
position compensating means, cooperating with said first means and said second means, for providing clock pulses to the $j^{th}$ stage of said first binary counter, as counted from the stage of least significance, at a rate equal to $k$ times said preselected constant speed.

16. A contour control system according to claim 15 wherein said first binary counter is divided into modules of four stages each, wherein said $j^{th}$ stage corresponds to the $m^{th}$ stage of one of said modules, $m$ being an integer between 1 and 4, and wherein said position compensating means comprises means for providing clock pulses from said second comparator means to the module containing said $j^{th}$ stage at a rate equal to $k$ times said preselected constant speed times $2^{(m-1)}$.

17. A contour control system according to claim 16 wherein said second comparator means receives pulses at a clock rate equal to 16 times said preselected constant speed, wherein output pulses from said second comparator means are at a rate equal to $8k$ times said preselected constant speed, and wherein said position compensating means comprises means for dividing pulses received from said second compensator means by $2^{(4-m)}$.

18. A contour control system according to claim 17 wherein said source of clock pulses comprises:
oscillator means for producing a train of clock pulses, and
rate modifier means, cooperating with said oscillator means and with a digital input specifying said preselected constant speed, for providing clock pulses to said fourth binary counter at a rate equal to 16 times said preselected constant speed.

19. A contour control system according to claim 17 wherein said position compensating means comprises:
a second binary counter advanced by said clock pulses,
means for inhibiting advance of said second binary counter upon occurrence of the initial command pulse from said first comparator means, the contents of said second binary counter then corresponding to $m$,
a fifth binary counter repetitively cycled in response to output pulses from said second comparator means, and
third comparator means cooperating with said second and fifth binary counters, for providing an output of $m$ pulses for each eight pulses received by said fifth binary counter, the output pulses from said third comparator means being provided to said module containing said $j^{th}$ stage.

20. A contour control system according to claim 6 further comprising:
means for providing a "cycle complete" signal when all active stages of said first binary counter are true, and
means responsive to said "cycle complete" signal for entering a new set of binary representations into said first and second registers, for resetting said first binary counter and said means for comparing, and for initiating generation of the command pulses corresponding to said new set of binary representations.

* * * * *